US011074598B1

(12) United States Patent
Kumar et al.

(10) Patent No.: US 11,074,598 B1
(45) Date of Patent: Jul. 27, 2021

(54) USER INTERFACE INTEGRATING CLIENT INSIGHTS AND FORECASTING

(71) Applicant: Cox Communications, Inc., Atlanta, GA (US)

(72) Inventors: Uday R. Kumar, Elmhurst, IL (US); Diana Tsiang, Dunwoody, GA (US); Stefano Francesco Vaccari, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 109 days.

(21) Appl. No.: 16/431,827

(22) Filed: Jun. 5, 2019

Related U.S. Application Data

(60) Provisional application No. 62/712,690, filed on Jul. 31, 2018, provisional application No. 62/713,291, filed on Aug. 1, 2018.

(51) Int. Cl.
*G06Q 30/02* (2012.01)
*G06N 5/04* (2006.01)
(Continued)

(52) U.S. Cl.
CPC ......... *G06Q 30/0202* (2013.01); *G06F 9/451* (2018.02); *G06N 5/048* (2013.01); *G06N 20/00* (2019.01)

(58) Field of Classification Search
None
See application file for complete search history.

(56) References Cited

U.S. PATENT DOCUMENTS 7,813,951 B2 * 10/2010 Eskandari .......... G06Q 30/0201
705/7.31
7,813,952 B2 * 10/2010 Eskandari .......... G06Q 30/0283
705/7.31
(Continued)

FOREIGN PATENT DOCUMENTS

AU       2006235959 B2 *  3/2009  ......... G06Q 10/0637
EP          3136332 A1 *  3/2017  ............. G06F 16/25
WO    WO-2014070573 A2 *  5/2014  ............. G06Q 50/01

OTHER PUBLICATIONS

Vafeiadis, Thanasis, et al. "A comparison of machine learning techniques for customer churn prediction." Simulation Modelling Practice and Theory 55 (2015): 1-9. (Year: 2015).*

(Continued)

*Primary Examiner* — Matthew S Gart
*Assistant Examiner* — Derick J Holzmacher
(74) *Attorney, Agent, or Firm* — Merchant & Gould P.C.

(57) ABSTRACT

New client acquisition insights and forecasting are provided. A system, method, and computer readable storage device analyze historical data for identifying various client segments based on various combinations of similar attributes; determine cumulative marginal values (CMVs) associated with provisioning clients in each client segment, wherein the CMVs indicate whether provisioning a client within each client segment positively or negatively affects the system; analyze each client segment behavior for learning insights associated with clients in the client segment and effects on the system; and forecast CMVs for a selected client segment based on the learned insights for the selected client segment. In various implementations, a dashboard user interface comprising a data visualization of the forecasted CMVs is generated for display. Based on the learned insights and forecasted CMVs, the system is enabled to manage new (Continued)

client deployments and allocate resources such that the efficiency and cost-effectiveness of the system are improved.

20 Claims, 15 Drawing Sheets

(51) Int. Cl.
*G06N 20/00* (2019.01)
*G06F 9/451* (2018.01)

(56) References Cited

U.S. PATENT DOCUMENTS

| | | | | |
|---|---|---|---|---|
| 7,917,383 | B2* | 3/2011 | Maga | G06Q 30/02 705/7.31 |
| 8,428,997 | B2* | 4/2013 | Maga | G06Q 10/06393 705/7.29 |
| 8,712,828 | B2* | 4/2014 | Maga | G06Q 30/02 705/7.31 |
| 2007/0185867 | A1* | 8/2007 | Maga | G06F 16/24 |
| 2011/0295649 | A1* | 12/2011 | Fine | G06Q 30/0201 705/7.29 |
| 2012/0191631 | A1* | 7/2012 | Breckenridge | G06N 20/00 706/12 |
| 2013/0279672 | A1* | 10/2013 | Mohan | H04M 15/47 379/133 |
| 2014/0119522 | A1* | 5/2014 | Phadke | H04M 15/58 379/133 |
| 2015/0039540 | A1* | 2/2015 | Dong | G06N 5/04 706/12 |
| 2015/0310336 | A1* | 10/2015 | Sotela | G06N 20/10 706/12 |
| 2015/0371163 | A1* | 12/2015 | Noh | G06Q 10/0635 705/7.28 |
| 2016/0203509 | A1* | 7/2016 | Sharp, III | G06Q 30/0244 705/14.43 |
| 2016/0225025 | A1* | 8/2016 | Sinha | G06Q 30/0257 |
| 2017/0004513 | A1* | 1/2017 | Vadakattu | G06Q 30/0202 |
| 2017/0060930 | A1* | 3/2017 | Elkherj | G06F 16/248 |
| 2019/0266622 | A1* | 8/2019 | Turnbull | G06N 20/00 |
| 2019/0303726 | A1* | 10/2019 | Cote | G06N 20/00 |

OTHER PUBLICATIONS

Kibria, Mirza Golam, et al. "Big data analytics, machine learning, and artificial intelligence in next-generation wireless networks." IEEE access 6 (2018): 32328-32338. (Year: 2018).*

Ahmad, Abdelrahim Kasem, Asset Jafar, and Kadan Aljoumaa. "Customer churn prediction in telecom using machine learning in big data platform." Journal of Big Data 6.1 (2019): 1-24. (Year: 2019).*

Huang, Bingquan, Mohand Tahar Kechadi, and Brian Buckley. "Customer churn prediction in telecommunications." Expert Systems with Applications 39.1 (2012): 1414-1425. (Year: 2012).*

* cited by examiner

US 11,074,598 B1

USER INTERFACE INTEGRATING CLIENT INSIGHTS AND FORECASTING

CROSS REFERENCE TO RELATED APPLICATIONS

This application claims the benefit of U.S. Provisional Application No. 62/712,690, having the title of "User Interface Integrating Client Insights and Forecasting" and the filing date of Jul. 31, 2018, and U.S. Provisional Application No. 62/713,291, having the title of "User Interface Integrating Client Insights and Forecasting" and the filing date of Aug. 1, 2018, which are incorporated herein by reference in their entireties.

BACKGROUND

Being able to efficiently determine whether acquisition of a new client or deployment of service to a new client will positively or negatively affect aspects of a system is a technical problem for which a technical solution is needed. For example, in a service provider system that provides one or more types of services to customers via a networked infrastructure, adding additional clients to the system can favorably or adversely affect aspects of the system based on various attributes of the clients and the system. If decisions are made regarding allocating resources to acquiring and provisioning a new client without being able to intelligently forecast effects of the client on aspects of the system, the service provider may inefficiently allocate those resources to clients that do not benefit the provider system. That is, being able to determine and forecast an incremental value associated with adding a particular new client to the system, wherein the value is indicative of whether the incorporation of the new client is positively or negatively affecting the system, would enable the system to manage new client deployments and allocate resources in a way that improves the efficiency and cost-effectiveness of the system.

SUMMARY

Aspects of the present disclosure provide a technical improvement in part by determining whether addition of a client will positively or negatively affect aspects of a service provider system based in part on an insight and forecasting algorithm and/or user interface that provides feedback to ascertain how to allocate resources based on the determination. A system, method, and computer readable storage device are provided that generate a forecasting algorithm to analyze a large collection of historical data for identifying various segments of clients based on various combinations of similar attributes and to use the forecasting algorithm to: determine cumulative marginal values associated with provisioning clients in each client segment, wherein the cumulative marginal values indicate whether provisioning a client within each client segment positively or negatively affects aspects of the system; analyze behavior of each client segment for learning insights associated with clients in the client segment and corresponding effects on aspects of the system; receive a selection of a client segment; and responsive to the selection, expediently forecast cumulative marginal values for the selected client segment based on machine-learned insights for the selected client segment for providing immediate feedback (e.g., the forecasted values) in support of a decision making process regarding an efficient allocation of resources. By being able to forecast values associated with provisioning a new client for service, a service provider is enabled to efficiently determine how to allocate resources based on those values, which further enables the service provider to more efficiently manage/stabilize resources.

In various implementations, a dashboard user interface (UI) is generated for display on a display device, wherein the dashboard UI comprises a data visualization of the forecasted cumulative marginal values. According to an aspect, the UI comprising data visualizations of the forecasted values provides an improvement to the decision making process regarding an efficient allocation of resources. For example, the UI organizes forecasted values generated by the forecasting algorithm, and presents the values in a clear and interactive deliverable that enables users to quickly and easily view and compare values as part of making resource allocation decisions. Accordingly, based on the learned insights and forecasted cumulative marginal values, aspects of the system are enabled to improve management of new client deployments and allocation of resources in a way that improves the efficiency and cost-effectiveness of the system.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
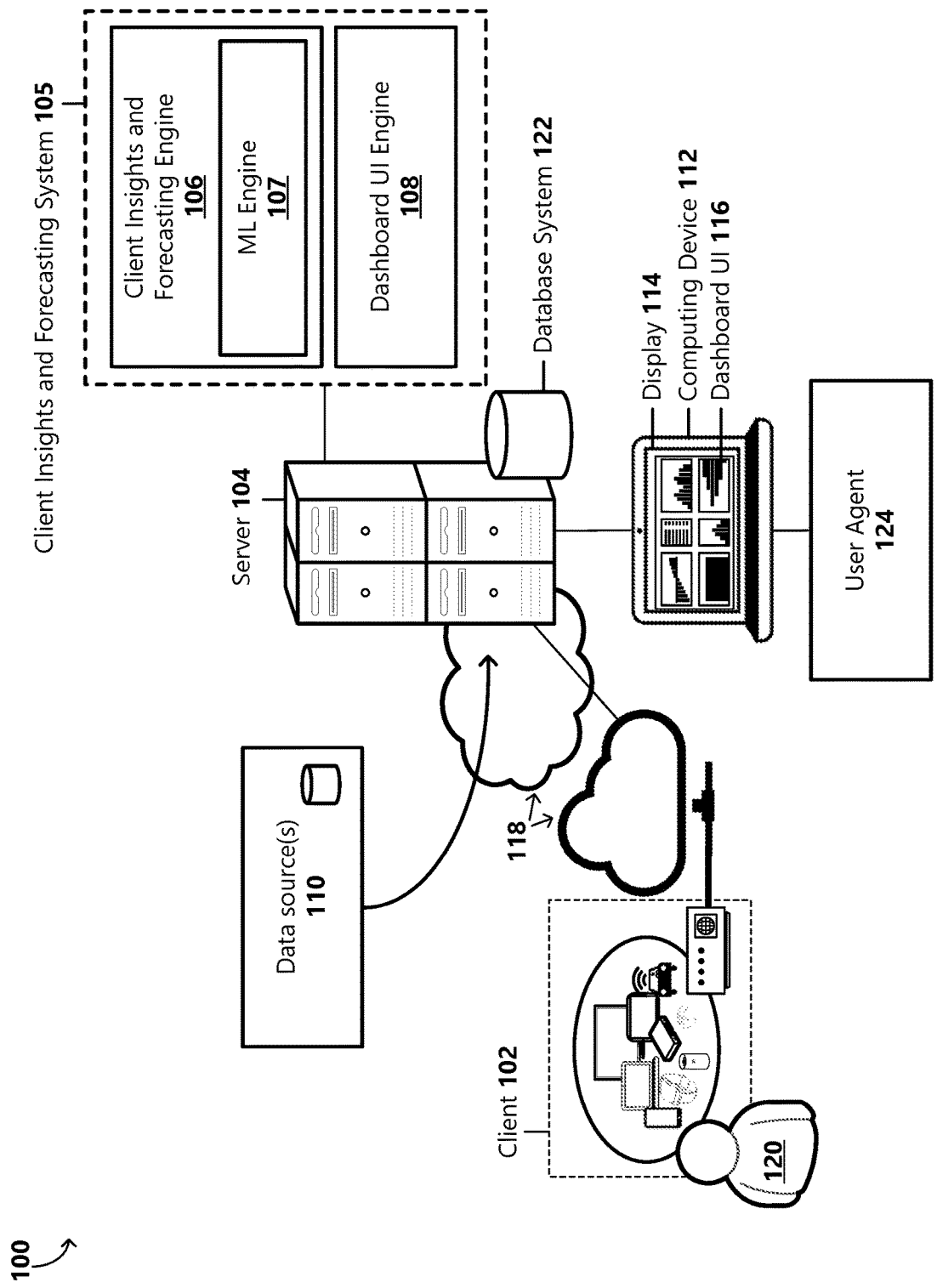
FIG. 1 is a block diagram of an example environment in which a system can be implemented for providing new client acquisition insights and forecasting according to an embodiment.

Aspects of the present disclosure provide a system, method, and computer readable storage device that provide a technical improvement to resource allocation determinations of a service provider by forecasting values and determining insights associated with provisioning a new client and presenting the determined information in a UI dashboard for enabling an efficient decision-making process including a decision of whether or in what manner to provision the new client and/or how to allocate resources in association with providing infrastructure resources to new clients. FIG. 1 is a block diagram of an example operating environment 100 in which aspects of the present invention can be implemented. As shown in FIG. 1, the example operating environment 100 includes a server 104 device on which one or more components of a client insights and forecasting system 105 are configured to run for providing new client acquisition and deployment insights and forecasting according to an embodiment. According to an aspect, the client insights and forecasting system 105 includes a client insights and forecasting engine 106 and a dashboard user interface (UI) engine 108. The server 104 can be implemented as a single computing device or as a plurality of computing devices cooperating in a distributed environment.

According to various implementations, the server 104 is part of a service provider system (i.e., service-provisioning system), wherein the service provider provides one or more types of services to users of various clients 102. In one example, the service provider is a provider of one or a combination of video services, data services, and phone services via a network 118 or a combination of networks (e.g., the Internet, an intranet, an extranet, local-area networks, wide-area networks, fiber-coax networks, public-switched telephone networks, global telephone networks, wired networks, wireless networks, and combinations thereof). For example, the service provider may provide services to clients 102 via an infrastructure (e.g., network(s)) owned or operated by the service provider. Other types of service-provisioning systems are possible and are within the scope of the present disclosure.

The client 102 can be implemented as one of various types of computing devices, such as a desktop computer, a tablet device, a mobile phone, a gaming console, a smart device, a phone, a set-top box, a dedicated digital media player, a modem, a router, etc. Details of computing devices and variations thereof can be found in FIGS. 13, 14A, 14B, and 15. According to an aspect, the client 102 is operative or configured to communicate with the service provider system for receiving one or more services (e.g., video services, data services, phone services) provided by the service provider.

According to examples, the client insights and forecasting engine 106, illustrative of a software application, module, or computing device, is operative or configured to execute one or more algorithms to generate and provide forecasted values for determining whether acquisition of a new client 102 will positively or negatively affect aspects of the service provider system. For example, as part of acquiring a new client 102 or provisioning a new client with service, a service provider may allocate various resources (e.g., network resources, computing resources, infrastructure resources, hardware customer-premises equipment (CPE) resources) to support that acquisition/provision. To determine whether acquisition of or provision of services or a particular service to a particular client 102 or client segment positively or negatively affects the service provider system, the client insights and forecasting engine 106 is configured to use machine learning to generate an algorithm and to use that algorithm to generate insights and/or forecast outputs based on historical data parameters that include known costs and past client behavior.

According to an example, the client insights and forecasting engine 106 executes a machine learning algorithm to analyze historical data including marginal incremental variable costs associated with acquiring and provisioning clients with service, ongoing costs (e.g., costs associated with sales commissions for acquiring a client, costs of laying cable to service a client, costs of equipment provided to the client, operational costs of service installation, customer care costs, network costs) associated with servicing those clients, and revenue collected from servicing those clients for determining client marginal values at various points in time. For example, the machine learning algorithm may be configured to learn and connect certain attributes of clients (e.g., demographic attributes and the client's marginal value) from the historical data in order to make predictions on the marginal value of prospective new clients. According to an aspect, a client marginal value represents a value or worth of a particular client 102 or a particular client segment to a service provider at a particular point in time. In various implementations, this value or worth is related to a profit or profit loss experienced by the service provider in association with acquiring a particular client or client segment and provisioning that client or client segment with service.

The client insights and forecasting engine 106 is further configured to analyze past client/client segment behavior (e.g., churn rate, disconnects, service use, payment history) for discovering insights into client/client segment behavior (e.g., uncovering past and projecting future resource allocations and/or usage) that can be used with determined historical client marginal values to generate a machine-learned algorithm that is configured to forecast values comprised of expenses and receipts over a specified time period for certain clients or client segments. As an example, the client insights and forecasting engine 106 may learn a relationship between a particular client property, such as automated billing or a subscription to a particular type of service (e.g., panoramic wireless service), and a higher marginal value and lower churn rate.

The client insights and forecasting engine 106 is further configured to generate graphical displays of forecasted data, which are generated and displayed such that efficiency (e.g., speed, accuracy) of decision making based on the effect of a client acquisition is increased. Forecasted values of particular clients or client segments can be used as part of determining whether allocating resources to a certain client or client segment is an efficient use of those resources. Based on forecasted profit gains/losses, those resources can be optimized for clients that benefit the service provider.

According to an example, a service provider can utilize the client insights and forecasting system 105 to forecast new client marginal values for a first client segment representative of a first potential new client and new client marginal values for a second client segment representative of a second potential new client. The service provider can further use the client insights and forecasting system 105 to compare the forecasted new client marginal values for the first client segment against forecasted new client marginal values for the second client segment as part of determining how to allocate resources based in part on profitability associated with the client segments. For example, forecasted new client marginal values may indicate that the first client segment is likely to produce a higher determined value at a particular point in time than the second client segment at the particular point in time. Further, adjustments can be made to various client segment attributes, which causes the client insights and forecasting engine 106 to utilize the machine-learned algorithm to re-forecast values based on the adjustments. Feedback generated and provided by the client insights and forecasting system 105 can include information indicating how adjustments in one or more attributes associated with a client segment affect the value of the client segment. Accordingly, the service provider can use the feedback to determine how to more efficient allocate resources based on a combination of attributes such that the forecasted client marginal values are maximized.

In various implementations, the client insights and forecasting engine 106 comprises a machine learning engine 107 that is operative or configured to evaluate historical data and client behavior for discovering insights that enable forecasting what effect implementation of a new client 102 on the service provider system has on the service provider system. In some examples, the machine learning engine 107 uses one or more unsupervised machine learning techniques (e.g., self-organizing maps, nearest-neighbor mapping, k-means clustering and singular value decomposition) to explore a dataset/datasets (e.g., historical data) stored in a database system 122 for identifying and learning patterns within the data. In some examples, the machine learning engine 107 uses one or a combination of other machine learning techniques (e.g., supervised machine learning, semi-supervised machine learning, reinforcement learning) for evaluating datasets stored in the database system 122 for discovering insights and for generating a machine-learned model based on the discovered insights.

In some examples, the database system 122 is embodied as a relational database system. For example, historical data can be collected from one or more data sources 110, normalized based on a schema, and stored in the relational database system, where the structured data can be stored, accessed, and analyzed, for example, using the Structured Query Language (SQL). In other examples, the database system 122 is embodied as a NoSQL (Not only SQL) database system. For example, historical data can be collected from one or more data sources 110 and stored and analyzed according to a non-relational and schema-less data model. In some implementations, the database system 122 is implemented as a distributed file system, wherein a resource manager may manage access on the file system and the client insights and forecasting engine 106 orchestrates execution on the storage layer.

According to an aspect, the one or more data sources 110 can include one or more service provider data sources and can additionally include one or more third-party data sources. For example, the database system 122 can collect and store billing data, customer information data, system infrastructure data, and the like from various service provider data sources 110, wherein the collected data includes information associated with various attributes, behavior (e.g., churn rate, service use, payment history), etc. According to an aspect, the client insights and forecasting engine 106 is operative or configured to evaluate the collected data for segmenting clients 102 into various subgroups based on one or a combination of the various attributes, and to discover insights associated with the subgroups or client segments. According to one example, the attributes can include one or a combination of: a product attribute, a credit class attribute, an income age attribute, an install-type attribute, a dwell type attribute, a market attribute, and a sales sub channel attribute. According to one implementation example, a client segment is based on sales channel, service provider segment, client subscriber credit class, product combo, dwell type, region, and install type. For example, a product attribute can describe a type of service provisioned to a client 102 (e.g., one or a combination of: video services, data services, and phone services). As another example, a credit class attribute can describe a particular credit classification of a client subscriber, wherein the classification may be a service provider-specific classification or a standardized classification. As another example, an install-type attribute can describe a particular type of installation (e.g., professional installation, self-installation, or undetermined). As another example, an install-type attribute can describe a type of dwelling where a client is provisioned with service (e.g., a single family unit or a multi-dwelling unit). As another example, sales sub channel attribute can describe a sales channel associated with a client acquisition (e.g., care, direct, inbound, nation affiliate, online, retail, temporary price reduction (TPR) promotion). The discovered insights can be used generate a model to forecast behaviors, system effects, resource allocation effects, and/or profits/losses.

As will be described in more detail below, the client insights and forecasting system 105 is configured to display discovered insights in a UI that helps to make a decision based on the insights more efficient, wherein the decision is associated with a service provider's allocation of resources. According to an aspect, the various attributes that subgroups are based on may be identified as efficiency and/or profitability drivers (i.e., analytics of interest). Example analytics of interest associated with a client 102 can include a service type, a sales channel used to acquire the client (e.g., care, direct, inbound, nation affiliate, online, retail, temporary price reduction (TPR) promotion), credit class (of the client user), dwelling type (e.g. classification of dwelling at which a client is provisioned with service), installation type, region/market, tier of service, demographic and ethnic segment (associated with the client user), payment type, etc.

According to an aspect, the client insights and forecasting engine 106 is operative or configured to execute a machine learning algorithm that evaluates behavior data associated with the various clients over a particular time period (e.g., 13 months, 28 months) for discovering insights associated with various attributes and client-associated behavior (e.g., churn rate, service use, payment history). According to an aspect, the database system 122 can collect and store other data, such as accounting data for determining marginal costs associated with providing service to a client 102. For example, other data can include: revenue data (e.g., recurring revenue, non-recurring revenue (PPV, OD, equipment, sales), credits, adjustments), direct cost data (e.g., programming costs, data and phone service costs, MDU (Multiple-Dwelling Unit) revenue share), operating expenses data (e.g., field services (non-install), care, network and technology, bank charges, supply chain, collections, sales and marketing (excluding subscriber acquisition cost)), operating cash flow data (e.g., cost allocation to expanded subs), capital expenditures data (e.g., distribution, drops, strategic platform), and subscriber acquisition cost (SAC) data (e.g., install truck rolls, CPE, sales commissions, marketing).

According to an aspect, the database system 122 can collect and store data associated with the service provider network 118 infrastructure. For example, the client insights and forecasting engine 106 can use infrastructure data to determine infrastructure requirements (e.g., bandwidth requirements, hardware requirements, network component requirements) for provisioning a new client 102. Infrastructure requirements can be based on provisioning services to a particular new client or client segment (e.g., requirements can be dependent on various factors such as location, equipment capacities, and other factors).

According to an aspect, the client insights and forecasting engine 106 is configured to determine new client marginal values (NCMVs) for determining and providing information indicating an effect of acquisition of a new client 102 on the system. According to an example, the NCMV is calculated using revenue data, service provider OCF data related to services that sell media advertising spots to advertisers, direct cost data, operating expense (OPEX) data, capital expense (CAPEX) data, and SAC data. For example, a contribution value can be determined based on a calculated difference between revenue and direct costs (contribution value=revenue−direct costs), wherein revenue can include monies collected from clients for service (e.g., recurring revenue, non-recurring revenue, credits and adjustments) and direct costs, wherein direct costs include costs that can be directly attributable to a service (e.g., programming costs, data and phone service costs, MDU (Multiple Dwelling Units) revenue share). For example, recurring revenue may include revenue that is charge monthly for that month of service; non-recurring revenue may include one-time charges charged for one-time services (e.g., an on-demand movie); credits and adjustments may include any payment made back to the client (e.g., for interruption of service); programming costs may include costs paid to content providers for media content; and MDU revenue share may include any commissions paid to apartment (or other MDU) leasing agents/managers.

An operating value can be determined based on a calculated difference between the determined contribution value and OPEX data (excluding SAC) plus service provider (SP) OCF (e.g., operating value=contribution value−OPEX (excluding SAC)+SP OCF). For example, OPEX data can include field services, care, network and technology bank charges, supply chain, collection, sales and marketing data, etc., and SP OCF can include a determined cost associated with expanding subs. The NCMV can be determined by subtracting CAPEX (e.g., including distribution, drops, and strategic platform data) and SAC (e.g., install truck roll, CPE, sales commissions, marketing) from the determined operating value.

According to an aspect, the dashboard UI engine 108 includes programmatic instructions that operate to generate and provide a dashboard UI 116 for presentation on a display 114 associated with a computing device 112 via a user agent 124 executing on the computing device, wherein the user agent is configured to communicate with the dashboard UI engine 108. The dashboard UI 116 includes various selectable attribute item menus, which correspond with the various attributes on which client subgroups are based. The various selectable attribute item menus can include but are not limited to: a product attribute menu, a credit class attribute menu, an income age attribute menu, an install-type attribute menu, a dwell type attribute menu, a market attribute menu, and a sales sub channel attribute menu. As should be appreciated, other attribute item menus are possible and are within the scope of the present disclosure. The attribute item menus provided in the dashboard UI 116 enable a user to specify a client segment for determining and viewing forecasting data for that segment.

The client insights and forecasting engine 106 is configured to receive a selection of a client segment (e.g., the dashboard UI engine communicates user-selections to the client insights and forecasting engine). According to an aspect, the client segment is selected via a selection of one or more attributes (e.g., via a selection of attributes included in one or more attribute item menus displayed in the dashboard UI 116) associated with the client segment. For example, the client segment selection may be associated with a particular use case scenario for which a service provider may want to determine various forecasts values, for example, for use in determining how to allocate resources to marketing to a particular client segment, to determine how to allocate resources to provision clients in a particular client segment with service, to determine whether to provision a client in a particular client segment with service, etc.

Responsive to receiving a selection of one or more attributes, the client insights and forecasting engine 106 is operative or configured to forecast cumulative marginal values for the selected client segment based on the machine-learned model according to learned insights for the selected client segment. In various examples, the client insights and forecasting engine 106 is operative or configured to receive attribute data associated with a particular client segment, and the client insights and forecasting engine 106 is further operative or configured to forecast cumulative marginal values for the selected client segment based on learned client behavior insights of a similar client segment (i.e., cohort segment) and based on known costs, expenses, and determined infrastructure requirements for provisioning services to past clients related to the selected client segment. In various implementations, the client insights and forecasting engine 106 forecasts cumulative marginal values for an expected lifetime of a client 102 (e.g., lifetime based on learned client behavior patterns).

According to an aspect, the forecasted cumulative marginal values indicate whether provisioning the client 102 positively or negatively affects the system. Based on the learned insights and forecasted cumulative marginal values, the system is enabled to manage new client 102 deployments and allocate resources in a way that improves the efficiency and cost-effectiveness of the system. For example, by being able to forecast values and determine how to allocate resources based on those values, a service provider is enabled to manage/stabilize those resources. According to various implementations, based on forecasted cumulative marginal values, near real-time decisions can be made in association with determining whether acquiring a new client 102 and/or determining pre-acquisition or post-acquisition actions for ensuring that a new client acquisition is efficient, cost-effective, and will not adversely affect aspects of the system.

According to an aspect, the dashboard UI engine 108 is illustrative of a software application, module, or computing device configured to generate a dashboard UI 116 comprising a data visualization of forecasted cumulative marginal values, which can be communicated over the network 118 to a computing device 112 for rendering to a user on a display 114. The generated dashboard UI 116 presents the forecasted cumulative marginal values and other decision-relevant information to the user such that a decision-making processing associated with allocation of resources for acquisition of a new client is more efficient. In various implementations, the data can be presented in a side-by-side comparison that provides an intuitive and easily-understandable display of decision-making criteria. According to one example, the decision-making criteria include profitability margins for particular client segments for determining how to allocate resources to particular client segments for acquiring new clients or for provisioning new clients with services. The dashboard UI 116 can be communicated over the network 118 to a computing device 112 for rendering to a user on a display 114. Information included in the dashboard UI 116 include a new client marginal value (NCMV) and other information associated with providing insights and forecasting that enables the system to determine and provide information indicating an effect of acquisition and/or deployment of a new client 102 on the system, wherein the information is displayed such that efficiency or accuracy of a decision making process regarding an efficient allocation of resources for acquisition and/or deployment is increased.

Based on the forecasted cumulative marginal values, the system is enabled to manage new client 102 deployments and allocate resources in a way that improves the efficiency and cost-effectiveness of the system. Examples of various example dashboard UI displays are illustrated in FIGS. 3-12 and will be described below.

Figure 2:
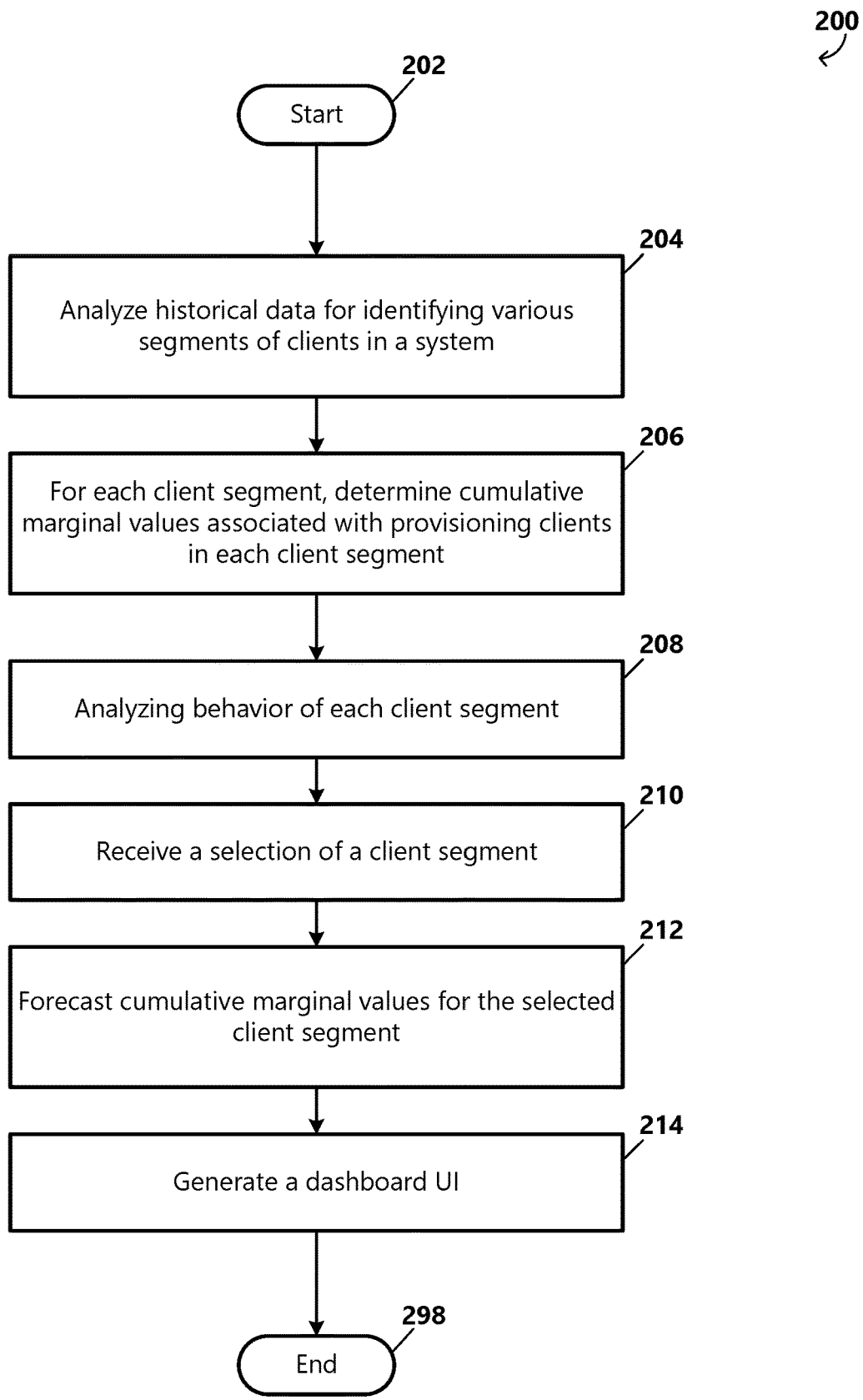
FIG. 2 is a flow diagram of depicting general stages of an example process for providing new client acquisition insights and forecasting according to an embodiment.

With reference now to FIG. 2, a flow diagram is provided that depicts general stages of an example method 200 for providing new client acquisition insights and forecasting according to an embodiment. The method 200 begins at START OPERATION 202, and proceeds to OPERATION 204 where the method executes the client insights and forecasting engine 106 to analyze historical data for identifying various segments of clients 102 in a service provider system, wherein a segment includes clients having a common attribute or combination of attributes.

At OPERATION 206, the method 200 uses the machine learning engine 107 to determine cumulative marginal values associated with provisioning clients 102 in each client segment over a monitored time period. For example, the machine learning engine 107 may analyze historical data for calculating a cumulative marginal value for a particular client as described above. At OPERATION 208, the method 200 further uses the machine learning engine 107 to discover/learn behavior patterns (e.g., churn rate, disconnects, service use, payment history) associated with the clients in the client segments. For example, a learned behavior pattern for a particular client segment may be a pattern of disconnections of service over the monitored time period. As another example, a learned behavior pattern for a particular client segment may be a pattern of payments or non-payments over the monitored time period. At OPERATION 208, the method 200 further uses the machine learning engine 107 to generate one or more machine-learned models or algorithms to forecast cumulate marginal values for potential new clients based on the learned behavior patterns and determine cumulative marginal values for the various client segments. For example, the machine learning engine 107 can learn how certain client attributes influence the cumulative marginal value, such that a service provider can change and optimize future strategies based on these findings.

At OPERATION 210, the method 200 uses the dashboard UI engine 108 to receive a selection of a client segment or attributes associated with a particular client 102 or client segment. For example, receipt of the client segment selection and selection of various attribute criteria is received as part of making a determination of how to optimize resources for acquisition or service-provisioning of a new client, wherein the selections are associated with the characteristics of the new client.

At OPERATION 212, the method 200 uses the client insights and forecasting engine 106 to use the machine-learned model to forecast cumulative marginal values for the selected client segment or for a client segment associated with selected attributes related to a particular client 102 or client segment based on the determined cumulative marginal values associated with provisioning clients 102 in the client segment and learned client behaviors over the monitored time period.

At OPERATION 214, the method 200 uses the dashboard UI engine 108 to generate a dashboard UI 116 comprising a data visualization of the forecasted cumulative marginal values and other decision-relevant data for a decision making process regarding an efficient allocation of resources. The generated dashboard UI 116 presents the forecasted cumulative marginal values and other decision-relevant data to the user such that the decision-making processing is more efficient. For example, responsive to receiving a selection of a client type (e.g., receive a selection of one or more attributes defining a client type), decision-relevant feedback that is generated based on the analysis and machine learning of vast amount of historical data is immediate provided and displayed to the user.

Additionally, the data can be presented in a side-by-side comparison, where forecasted values for one client segment can be easily evaluated in comparison with forecasted values of another client segment. That is, aspects provide an intuitive and easily-understandable display of decision-making criteria for determining how to allocate resources for acquiring new clients. Based on the forecasted cumulative marginal values and visual representations of the other forecasted values, deployments of new clients 102 and the resources that are allocated to those deployments can be managed/stabilized in a way that improves the efficiency and cost-effectiveness of the system. The method 200 ends at OPERATION 298.

Figure 3:
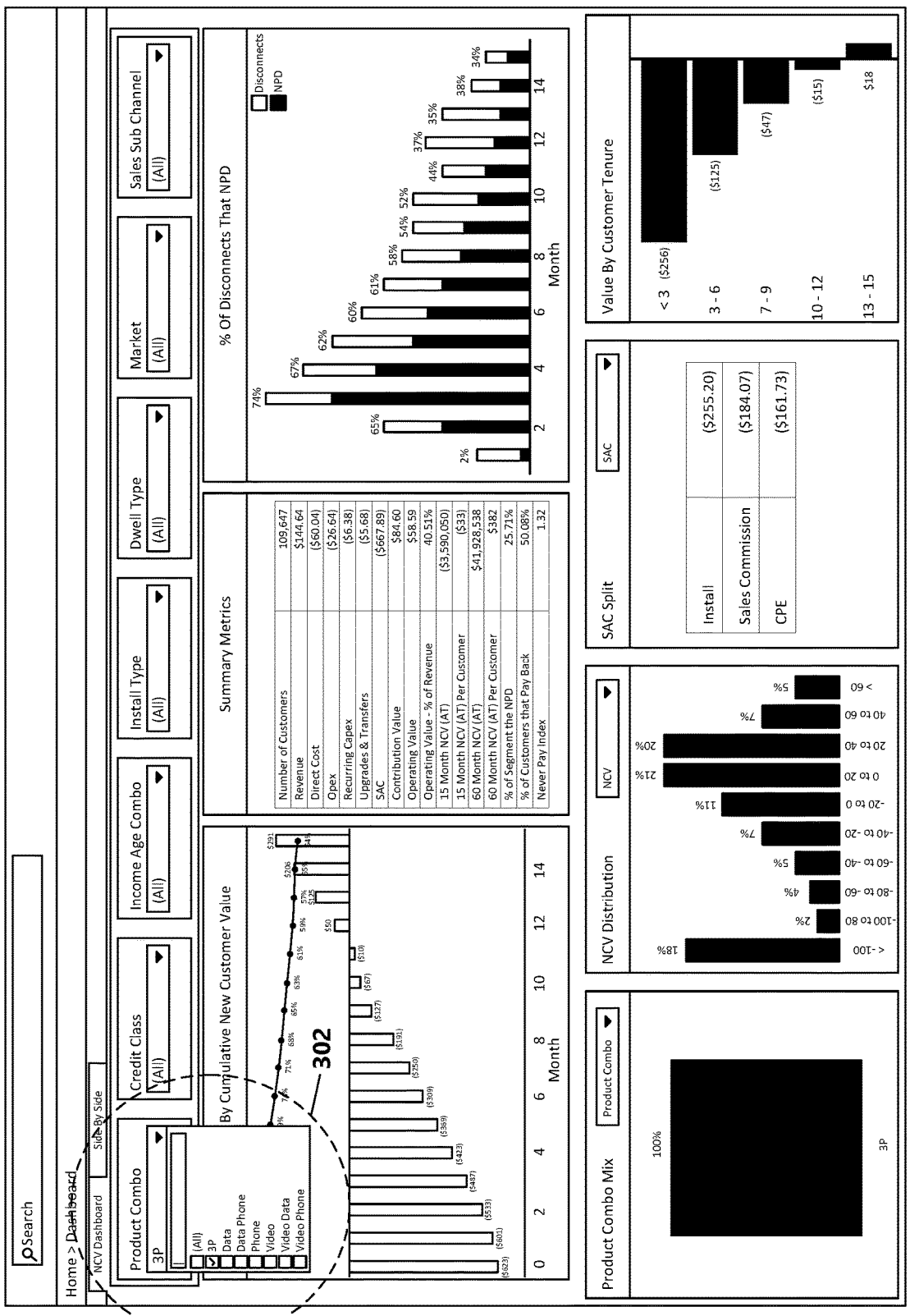
FIGS. 3-12 are illustrations of example dashboard user interface displays including data visualizations of new client acquisition insights and forecasts according to example use case scenarios.
Figure 4:
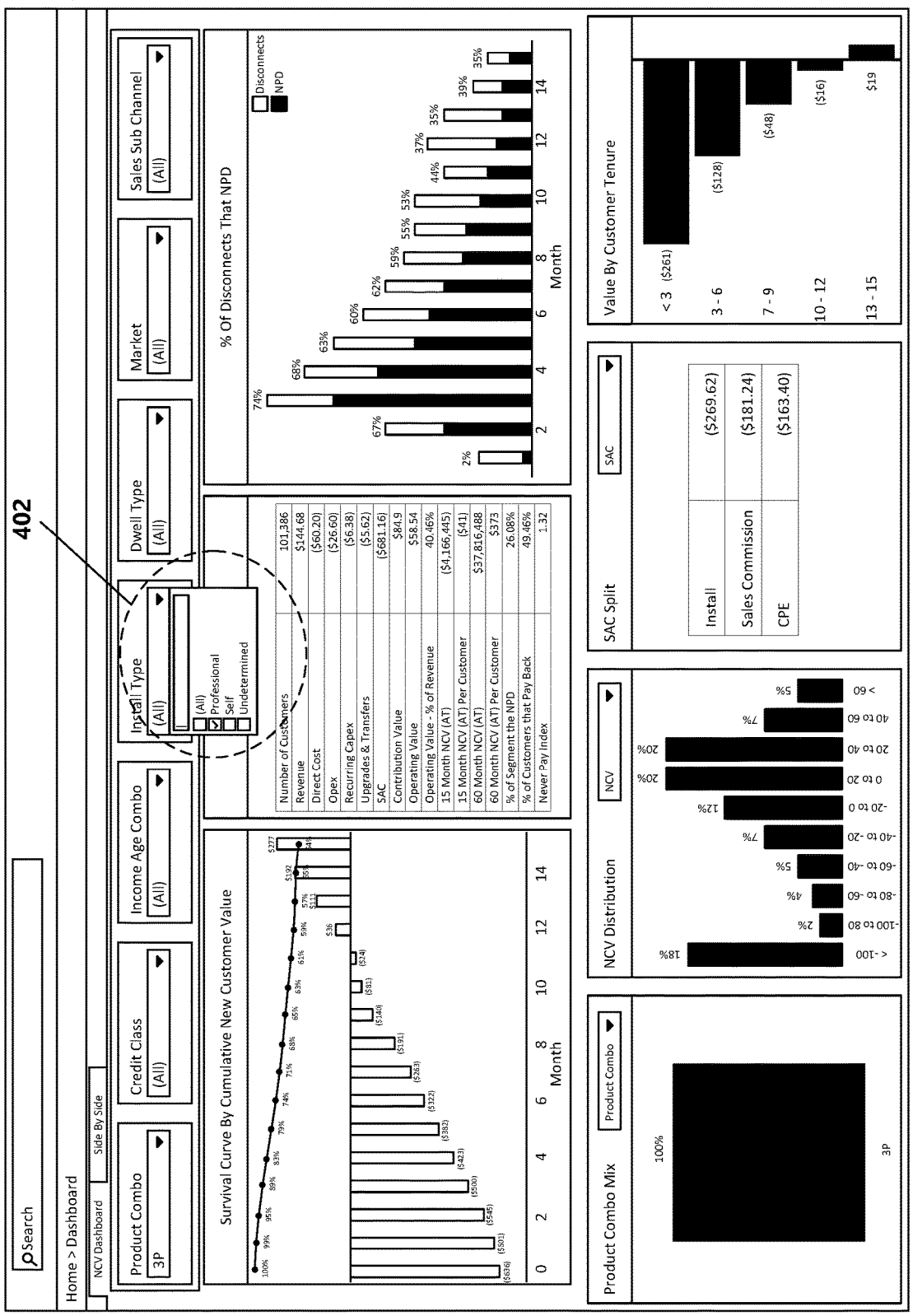
Figure 5:
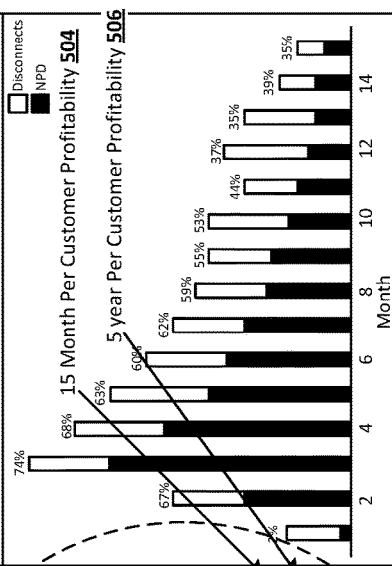
Figure 5:
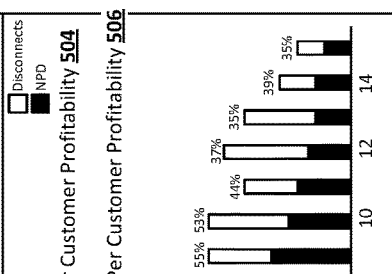
Figure 5:
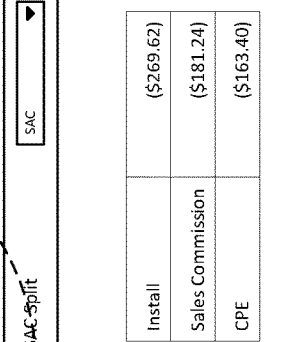
Figure 5:
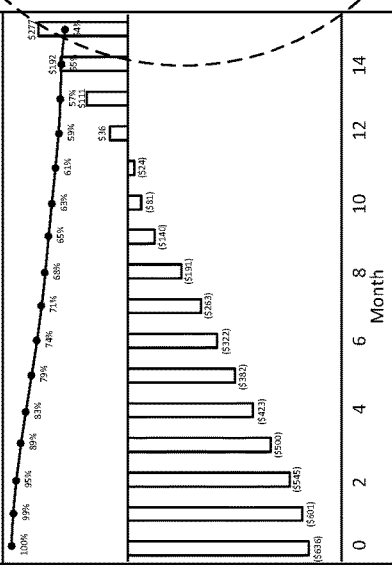
Figure 5:
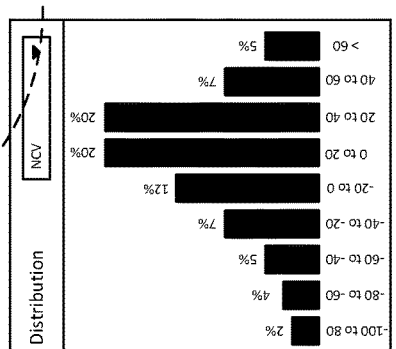
Figure 5:
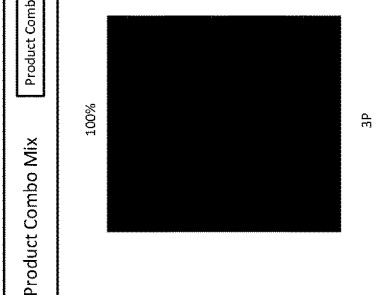

FIGS. 3-5 are illustrations of example dashboard UIs 116 including data visualizations of new client acquisition insights (e.g., decision-relevant data) and forecasts according to a first example use case scenario. FIG. 3 shows a selection of a product type/combination attribute 302 associated with a particular client 102 or a particular client segment from a first attribute item menu. In the illustrated example, a user is selecting the "3P" product combo (e.g., video, data, and phone services). Other selectable product types/combination attributes 302 include data service, data and phone service, phone service, video service, video and data service, and video and phone services. As can be appreciated, more, fewer, or other product types/combination attributes 302 are possible and are within the scope of the present disclosure. In response to a selection of a product type/combination attribute 302, the client insights and forecasting system 105 uses the machine-learned algorithm to forecast values for a client segment associated with the selected product type/combination attribute 302, and updates the UI dashboard 116 with the forecasted values. As illustrated, the forecasted values can include one or more of: cumulative new client marginal values, summary metrics, costs, client behavior (e.g., a forecast of disconnections, a forecast of payments), etc.

FIG. 4 shows a selection of an install type attribute 402 associated with a particular client 102 or a particular client segment from a second attribute item menu. In the illustrated example, a user is selecting "pro" or professional installation. Other selectable install type attributes 402 include self or undetermined. As can be appreciated, more, fewer, or other install type attributes 402 are possible and are within the scope of the present disclosure. In response to a selection of an install type attribute 402, the client insights and forecasting system 105 uses the machine-learned algorithm to forecast values for a client segment associated with the selected product type/combination attribute 302 and selected install type attribute 402.

FIG. 5 shows a summary of various calculated metrics 502 including a 15-month forecasted marginal value 504 and a 60-month forecasted marginal value 506 for a client segment associated with a provision of video, data, and phone services (product type/combination attribute 302) and a professional installation (install type attribute 402) across all credit classes, income age combos, dwell types, markets, and sales sub channels. For example, responsive to receiving the attribute selections and using the machine learned algorithm to forecast various values, the client insights and forecasting system 105 uses the UI engine 108 to update the UI dashboard 116 with the forecasted values and visual representations of the forecasted values. According to the illustration, the example client 102 or client segment is forecasted to have a positive value at 5 years. Additional information can be gleaned from the UI dashboard 116, such as new client value distribution values, a split of SAC costs, and values by client tenure. As can be appreciated, more, fewer, or other values can be determined from the data, and other data visualizations are possible and are within the scope of the present disclosure.

Figure 6:
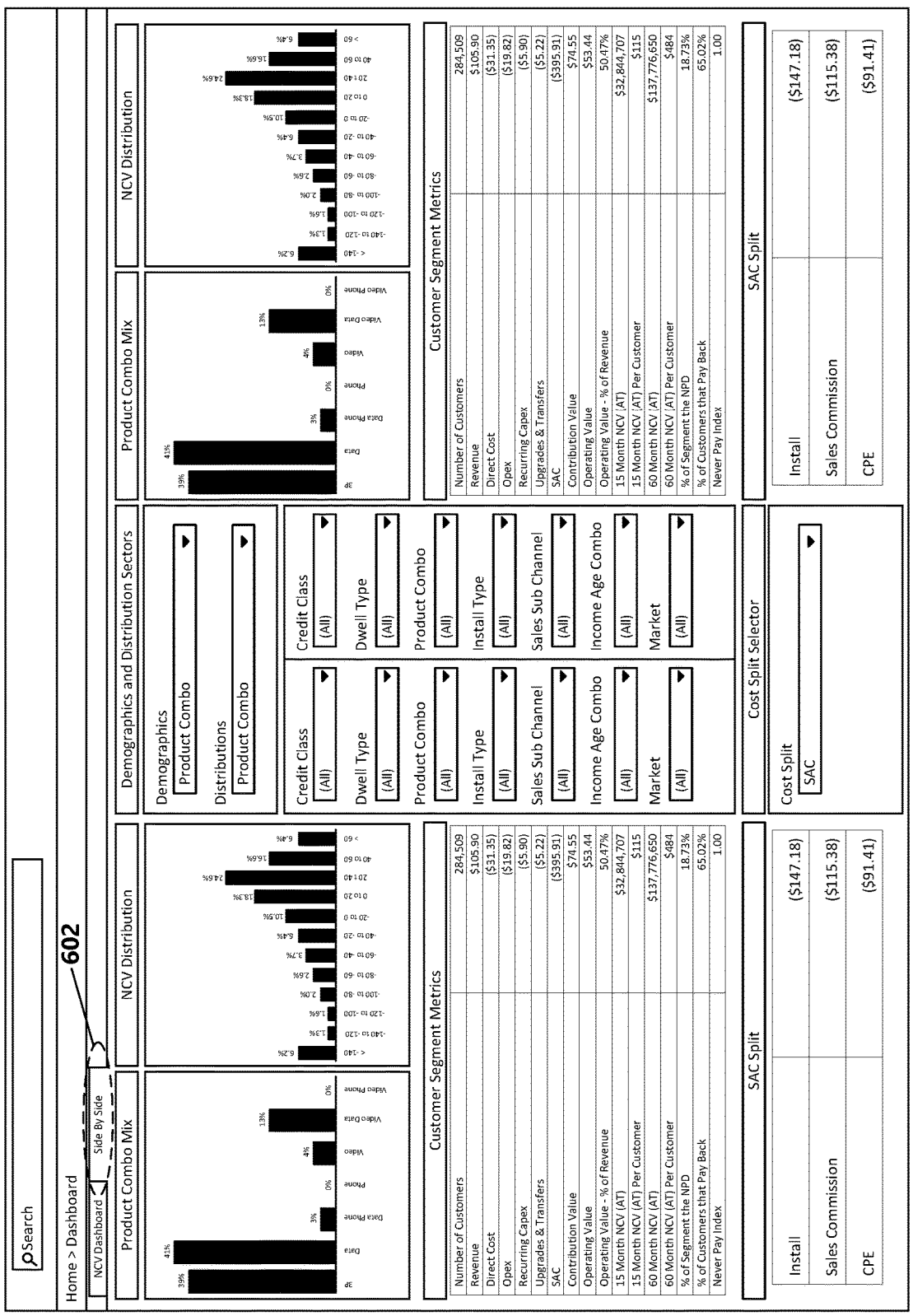

FIGS. 6-12 are illustrations of example dashboard UIs 116 including data visualizations of new client acquisition insights (e.g., decision-relevant data) and forecasts according to a second example use case scenario. FIG. 6 shows an example of a side-by-side comparison view 602. For example, in response to a selection of a side-by-side comparison display view, the UI 116 is updated to display of a side-by-side comparison of data visualizations of forecasted marginal values and other decision-relevant data associated with two or more selected client segments.

Figure 7:
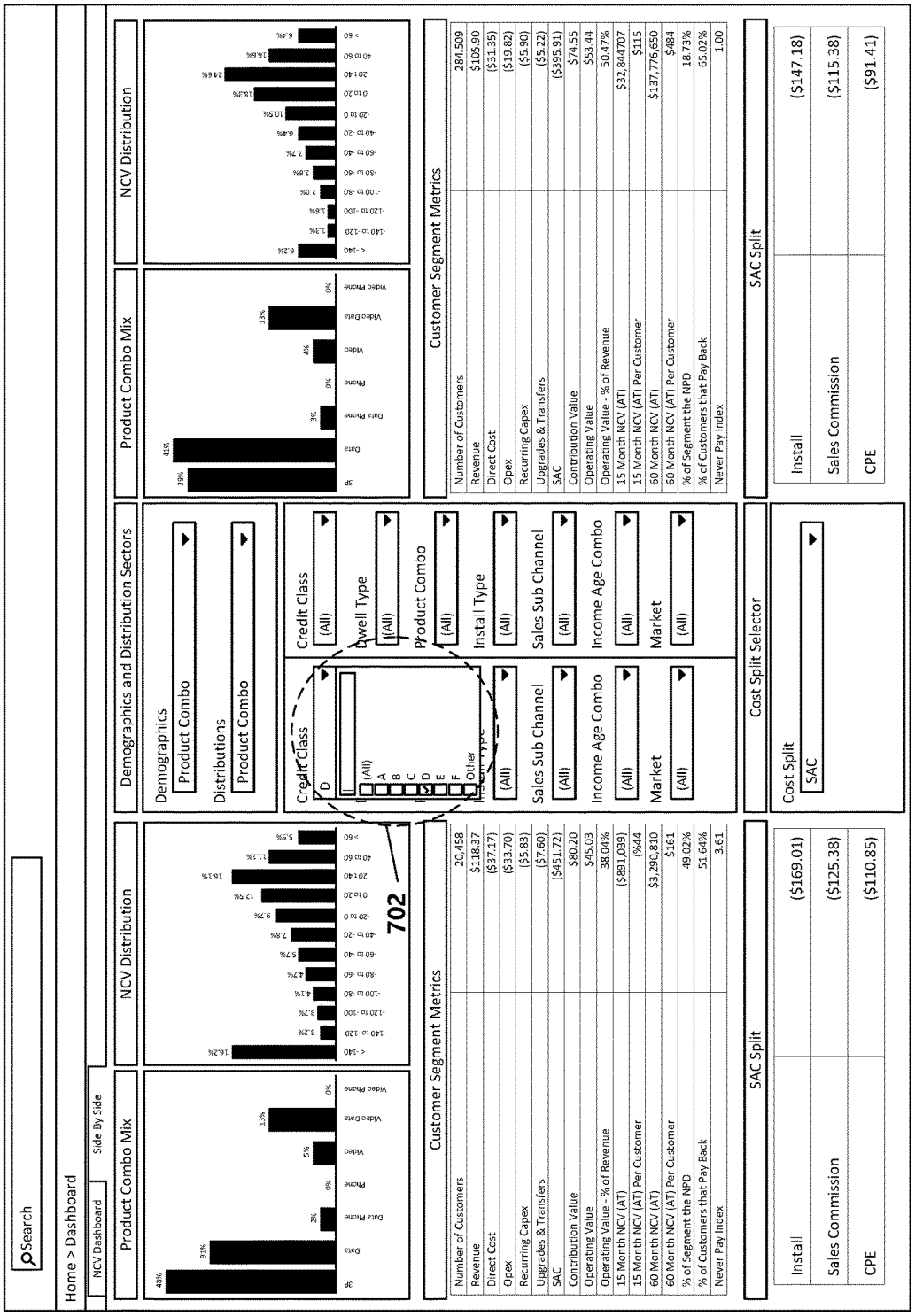

FIG. 7 shows a selection of a credit class attribute 702 (e.g., associated with a client 102 user/customer) for a first client 102 or client segment. In the illustrated example, a user has selected a "D" credit class. Responsive to the selection and as illustrated, the client insights and forecasting system 105 uses the machine-learned algorithm to forecast values for the first client segment (e.g., based on the selected attribute), and uses the UI engine 108 to update one side of the UI with the forecasted values for the first client segment.

Figure 8:
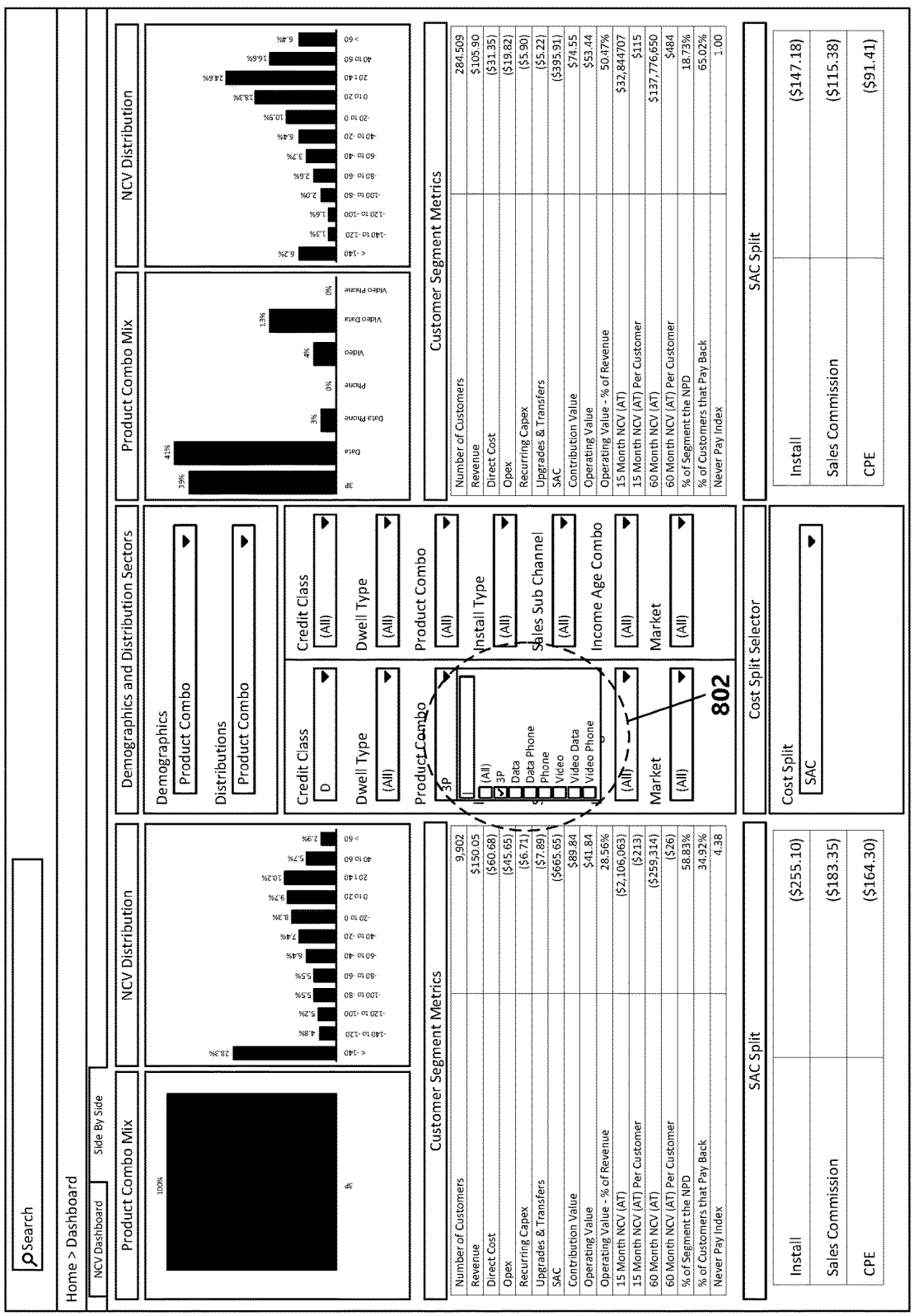

FIG. 8 shows a selection of a product type/combination attribute 802 associated with the first client 102 or client segment from an attribute item menu, wherein the selected product type/combination is "3P" (e.g., video, data, and phone services). Responsive to the selection and as illustrated, the client insights and forecasting system 105 uses the machine-learned algorithm to forecast values for the first client segment (e.g., based on the selected attribute), and uses the UI engine 108 to update one side of the UI with the forecasted values for the first client segment.

Figure 9:
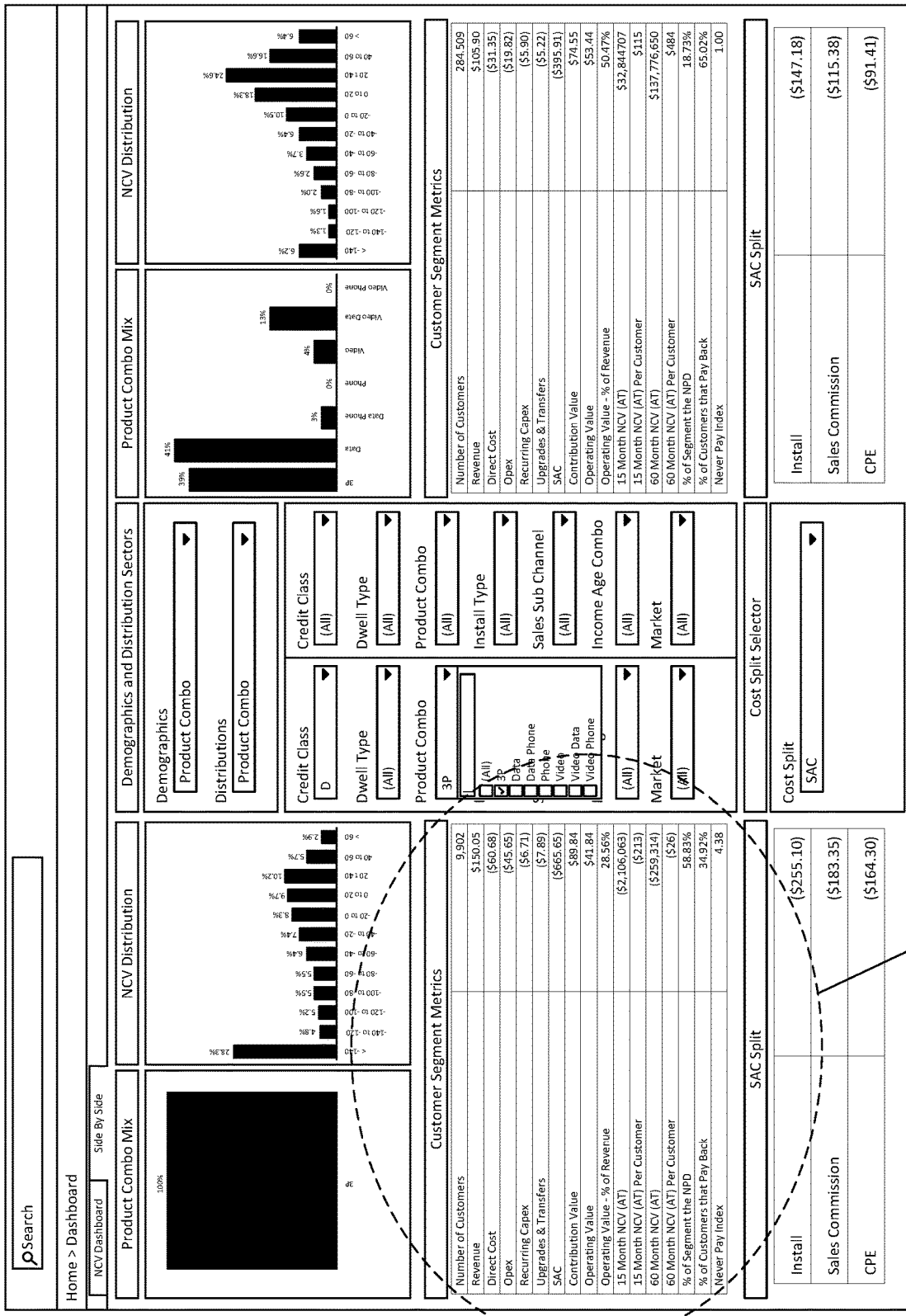

FIG. 9 shows a summary of various calculated metrics 902 including forecasted marginal values for the first client 102 or client segment, wherein the first client or client segment is associated with the following attributes: provision of video, data, and phone services and a D credit rating. For example, the forecasted marginal value data shows that a client matching attributes of the selected client segment may be expected to show a negative NCV at month 15 (e.g., −$213) and a negative NCV at month 60 (e.g., −$26). In the side-by-side comparison UI 116, the selected client segment forecasted values can be compared against forecasted values of a client segment including all clients (e.g., of all credit classes, dwell types, product combinations, installation types, sales channels, income age combinations, and markets). For example, comparison of the forecasted values for the client segment having the selected attributes of video, data, and phone services and a D credit rating against the client segment of all clients shows that the video, data, and phone services and a D credit rating client segment has lower NCV values at both the 15-month mark and the 60-month mark.

Figure 10:
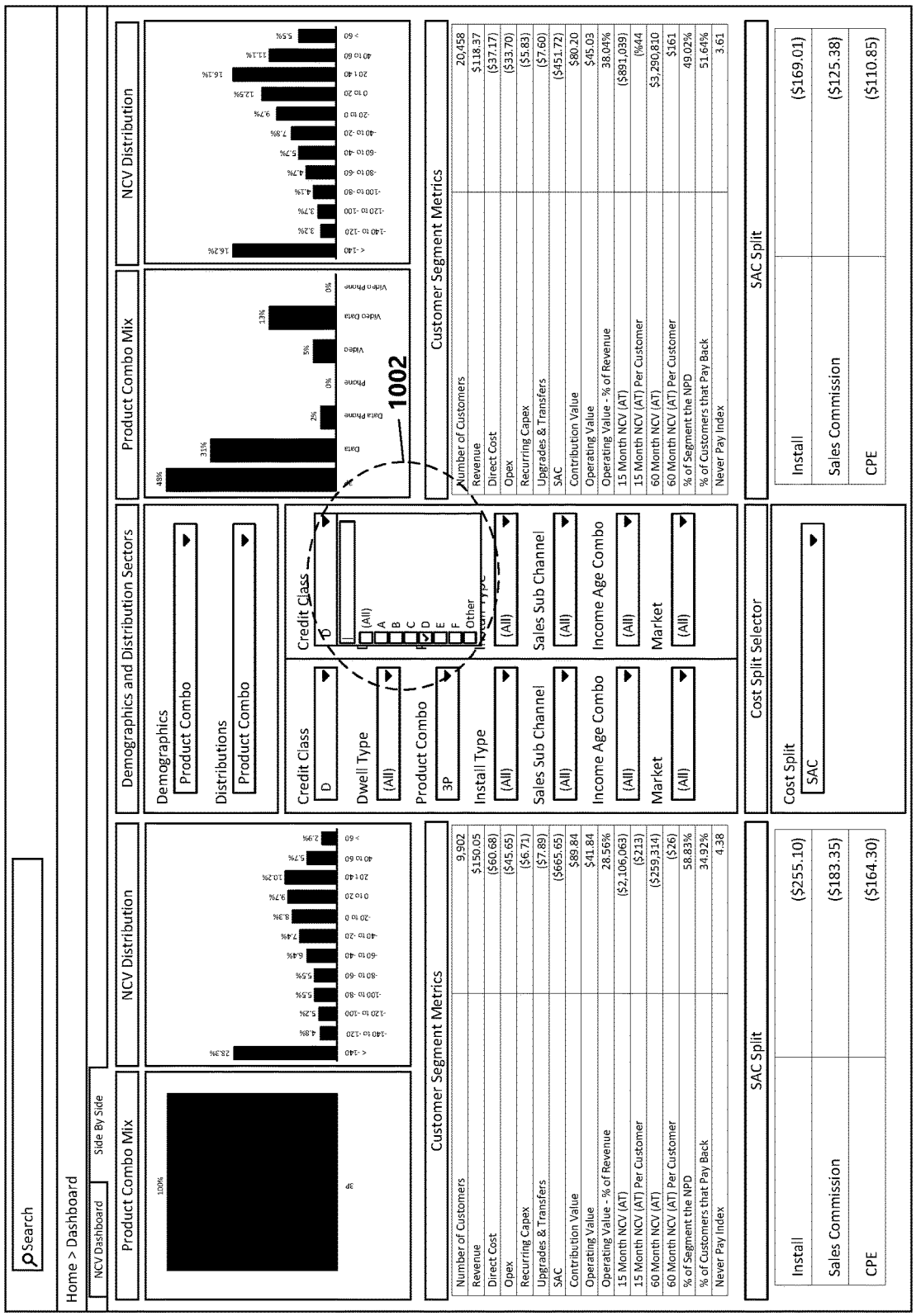

FIG. 10 shows a selection of a credit class attribute 1002 (e.g., associated with a client 102 user/customer) for a second client 102 or client segment. In the illustrated example, a user has selected a "D" credit class. Responsive to the selection and as illustrated, the client insights and forecasting system 105 uses the machine-learned algorithm to forecast values for the second client segment (e.g., based on the selected attribute), and uses the UI engine 108 to update one side of the UI with the forecasted values for the second client segment.

Figure 11:
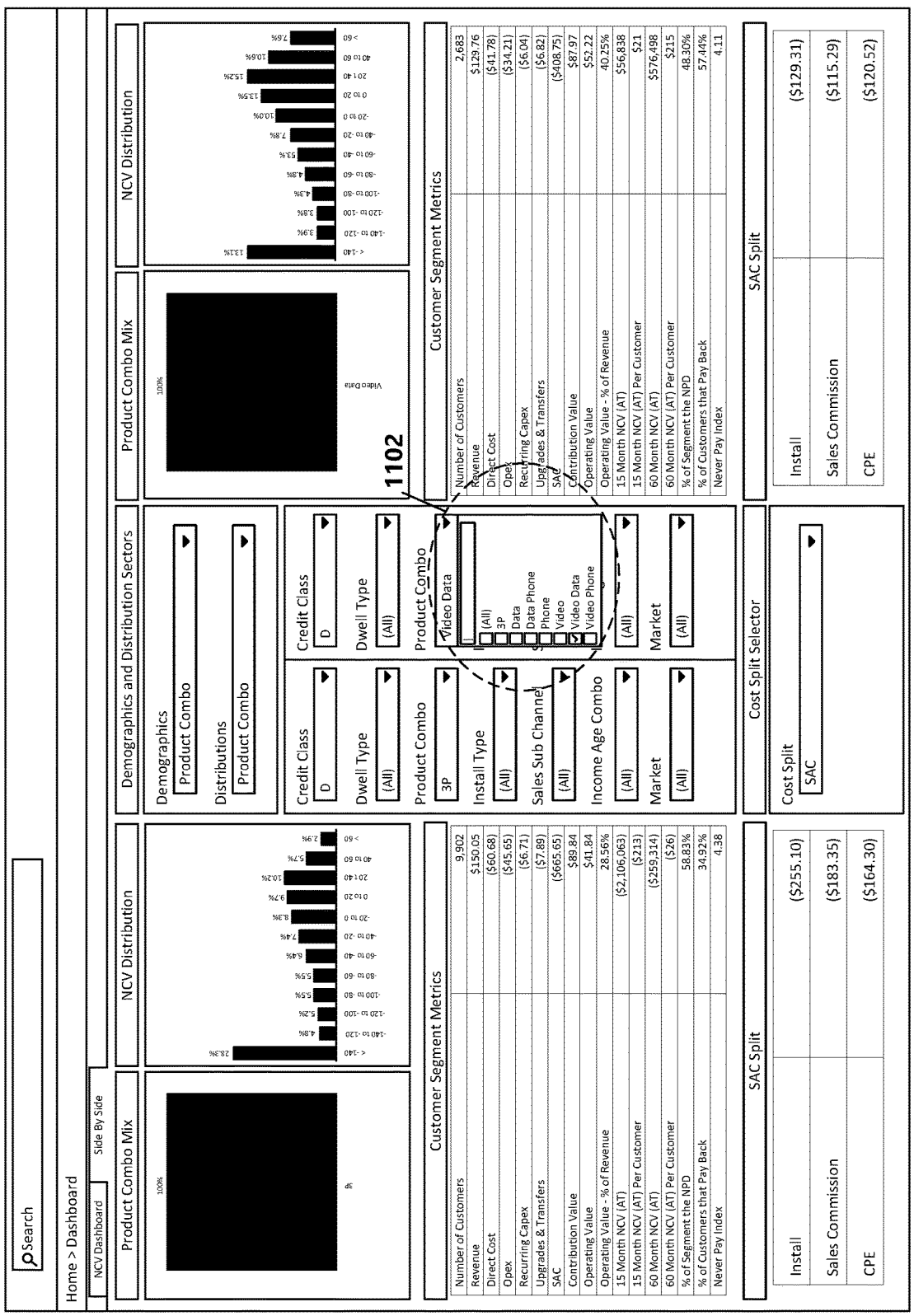

FIG. 11 shows a selection of a product type/combination attribute 1102 associated with the second client 102 or client segment, wherein the selected product type/combination is video and data. Responsive to the selection and as illustrated, the client insights and forecasting system 105 uses the machine-learned algorithm to forecast values for the second client segment (e.g., based on the selected attribute), and uses the UI engine 108 to update one side of the UI with the forecasted values for the second client segment.

Figure 12:
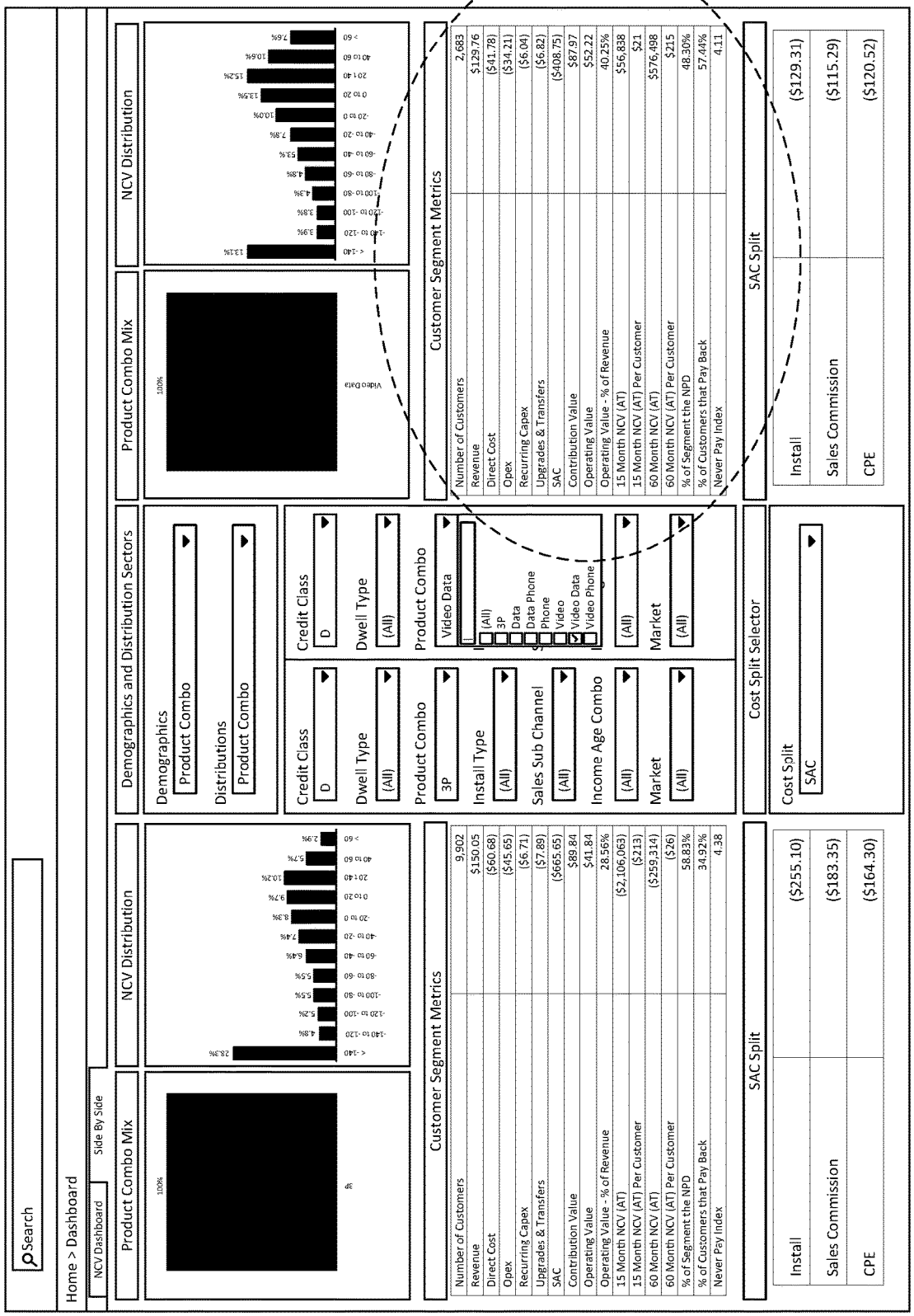

FIG. 12 shows a summary of various calculated metrics 1202 including forecasted marginal values for the second client 102 or client segment, wherein the second client or client segment is associated with the following attributes: provision of video and data and a D credit rating. That is, the UI 116 is updated to display the calculated forecasted marginal values 902,1202 and other decision-relevant data for both selected client segments in a side-by-side comparison view for enabling efficient side-by-side comparison. For example, presenting the data presented a side-by-side comparison provides an intuitive and easily-understandable display of decision-making criteria for determining how to allocate resources for acquiring new clients and/or servicing new clients.

Figure 13:
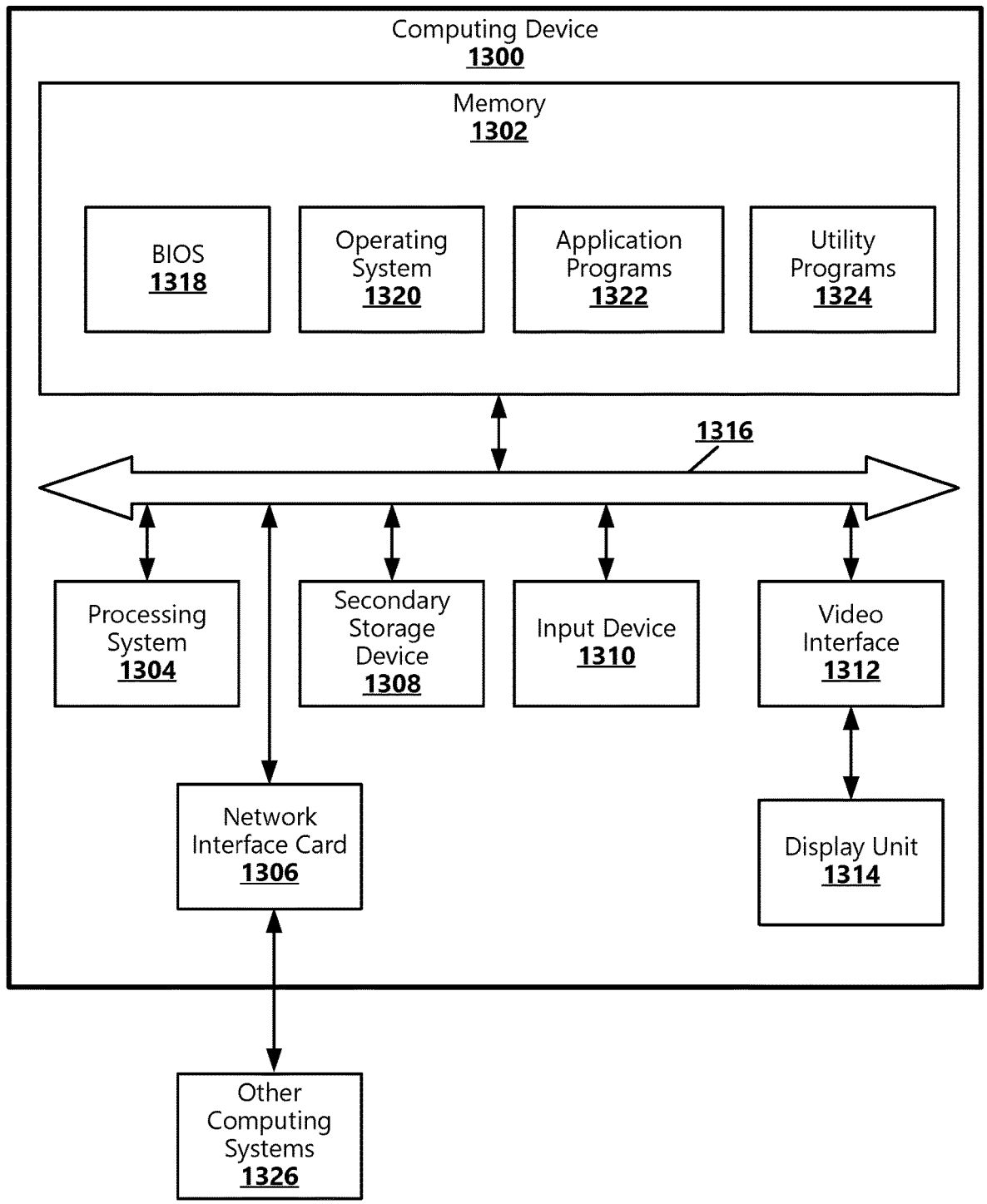
FIG. 13 is a block diagram illustrating example physical components of a computing device or system with which embodiments may be practiced.

FIG. 13 is a block diagram illustrating example physical components of a computing device or system 1300 with which embodiments may be practiced. It should be appreciated that in other embodiments, different hardware components other than those illustrated in the example of FIG. 13 may be used. Computing devices may be implemented in different ways in different embodiments. For instance, in the example of FIG. 13, the computing device 1300 includes a processing system 1304, memory 1302, a network interface 1306 (wired and/or wireless), radio/antenna 1307, a secondary storage device 1308, an input device 1310, a video interface 1312, a display unit 1314, and a communication medium 1316. In other embodiments, the computing device 1300 may be implemented using more or fewer hardware components (e.g., a video interface, a display unit, or an input device) or in combination with other types of computer systems and program modules 1326.

The memory 1302 includes one or more computer-readable storage media capable of storing data and/or computer-executable instructions. Memory 1302 may store the computer-executable instructions that, when executed by processor 1304, provide improved network performance of network performant-sensitive online activities. In various embodiments, the memory 1302 is implemented in various ways. For example, the memory 1302 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and nonremovable media implemented in various methods or technologies for storage and retrieval of information. Such information can include data structures, program modules, computer-executable instructions, or other data.

The processing system 1304 includes one or more processing units, which may include tangible integrated circuits that selectively execute computer-executable instructions. In various embodiments, the processing units in the processing system 1304 are implemented in various ways. For example, the processing units in the processing system 1304 can be implemented as one or more processing cores. In this example, the processing system 1304 can comprise one or more microprocessors. In another example, the processing system 1304 can comprise one or more separate microprocessors. In yet another example embodiment, the processing system 1304 can comprise Application-Specific Integrated Circuits (ASICs) that provide specific functionality. In yet another example, the processing system 1304 provides specific functionality by using an ASIC and by executing computer-executable instructions.

The computing device 1300 may be enabled to send data to and receive data from a communication network via a network interface card 1306. In different embodiments, the network interface card 1306 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 1308 includes one or more computer-readable storage media, and may store data and computer-executable instructions not directly accessible by the processing system 1304. That is, the processing system 1304 performs an I/O operation to retrieve data and/or computer-executable instructions from the secondary storage device 1308. In various embodiments, the secondary storage device 1308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 1310 enables the computing device 1300 to receive input from a user. Example types of input devices include, but are not limited to, keyboards, mice, trackballs, stylus input devices, key pads, microphones, joysticks, touch-sensitive display screens, and other types of devices that provide user input to the computing device 1300.

The video interface 1312 outputs video information to the display unit 1314. In different embodiments, the video interface 1312 is implemented in different ways. For example, the video interface 1312 is a video expansion card. In another example, the video interface 1312 is integrated into a motherboard of the computing device 1300. In various embodiments, the display unit 1314 can be an LCD display panel, a touch-sensitive display panel, an LED screen, a projector, a cathode-ray tube display, or another type of display unit. In various embodiments, the video interface 1312 communicates with the display unit 1314 in various ways. For example, the video interface 1312 can communicate with the display unit 1314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 1316 facilitates communication among the hardware components of the computing device 1300. In different embodiments, the communications medium 1316 facilitates communication among different components of the computing device 1300. For instance, in the example of FIG. 13, the communications medium 1316 facilitates communication among the memory 1302, the processing system 1304, the network interface card 1306, the secondary storage device 1308, the input device 1310, and the video interface 1312. In different embodiments, the communications medium 1316 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1302 stores various types of data and/or software instructions. For instance, in the example of FIG. 13, the memory 1302 stores a Basic Input/Output System (BIOS) 1318, and an operating system 1320. The BIOS 1318 includes a set of software instructions that, when executed by the processing system 1304, cause the computing device 1300 to boot up. The operating system 1320 includes a set of software instructions that, when executed by the processing system 1304, cause the computing device 1300 to provide an operating system that coordinates the activities and sharing of resources of the computing device 1300. The memory 1302 also stores one or more application programs or program code 1322 that, when executed by the processing system 1304, cause the computing device 1300 to provide applications to users. The memory 1302 also stores one or more utility programs 1324 that, when executed by the processing system 1304, cause the computing device 1300 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figures 14A, 14B:
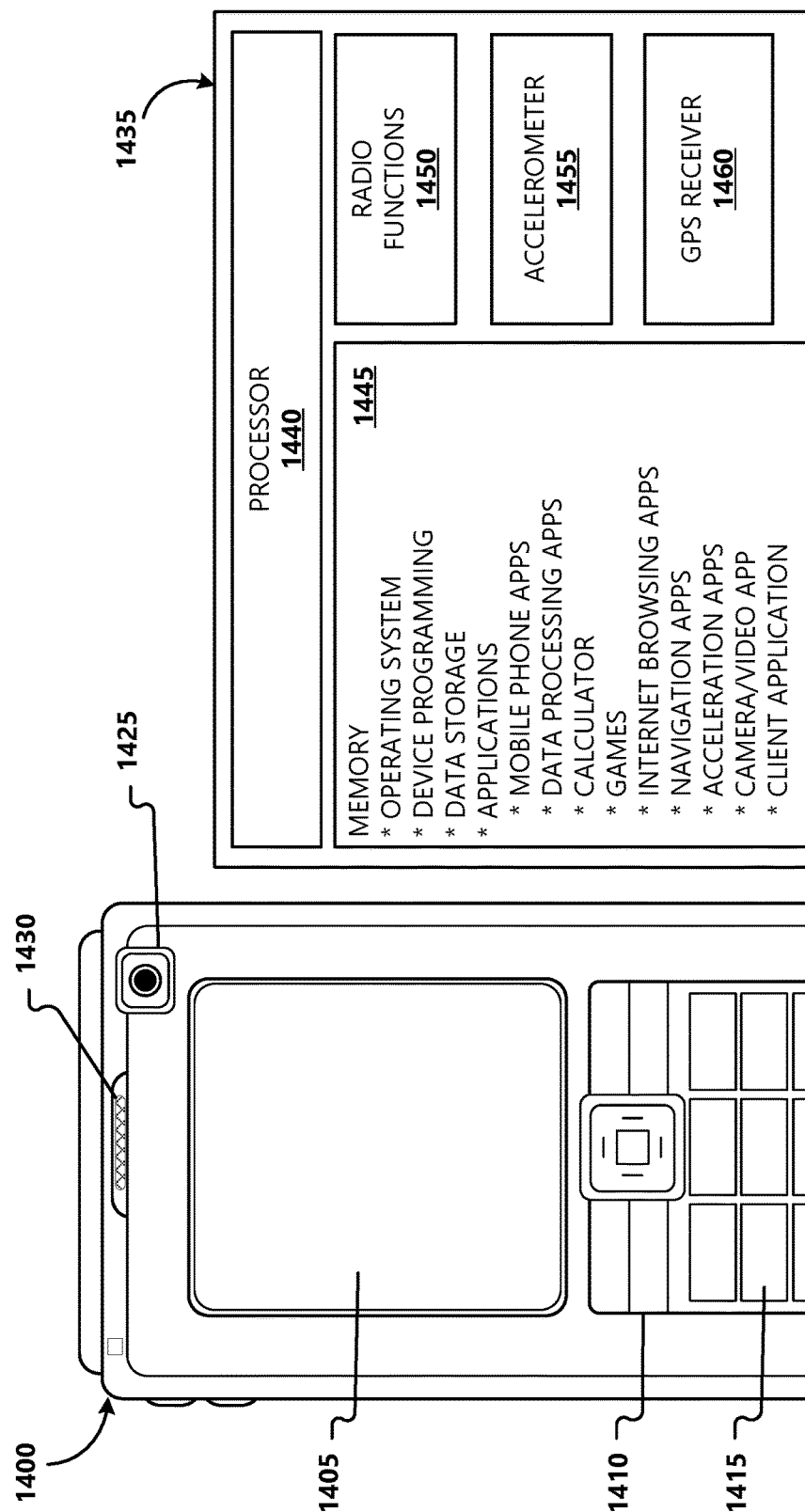
FIGS. 14A and 14B are block diagrams illustrating example physical components of a suitable mobile computing environment with which aspects of the present disclosure can be practiced.

FIGS. 14A-14B illustrate a suitable mobile computing device 1400 or environment, for example, a mobile computing device or smart phone, a tablet personal computer, a laptop computer, or other client 102, with which aspects can be practiced. The mobile computing device 1400 is illustrative of any suitable device operative to send, receive and process wireless communications. A display screen 1405 is operative for displaying a variety of information such as information about incoming and outgoing communications, as well as, a variety of data and displayable objects, for example, text, alphanumeric data, photographs, and the like.

Data input to the mobile computing device 1400 can be performed via a variety of suitable means, such as, touch screen input via the display screen 1405, keyboard or keypad input via a data entry area 1410, key input via one or more selectable buttons or controls 1415, voice input via a microphone 1418 disposed on the mobile computing device 1400, photographic input via a camera 1425 functionality associated with the mobile computing device 1400, or any other suitable input means. Data can be output via the mobile computing device 1400 via any suitable output means, including but not limited to, display on the display screen 1405, audible output via an associated speaker 1430 or connected earphone system, vibration module for providing tactile output, and the like.

Referring now to FIG. 14B, operational unit 1435 is illustrative of internal operating functionality of the mobile computing device 1400. A processor 1440 is illustrative of a computer processor for processing incoming and outgoing data and communications and controlling operation of the device and associated software applications via a mobile computing device operating system. Memory 1445 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 1400 can contain an accelerometer 1455 for detecting acceleration, and can be used to sense orientation, vibration, and/or shock. Mobile computing device 1400 can contain a global positioning system (GPS) system (e.g., GPS send/receive functionality) 1460. A GPS system 1460 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 1450 include all required functionality, including onboard antennae, for allowing the mobile computing device 1400 to communicate with other communication devices and systems via a wireless network. Radio functions 1450 can be utilized to communicate with a wireless or WIFI-based positioning system to determine a device location.

Figure 15:
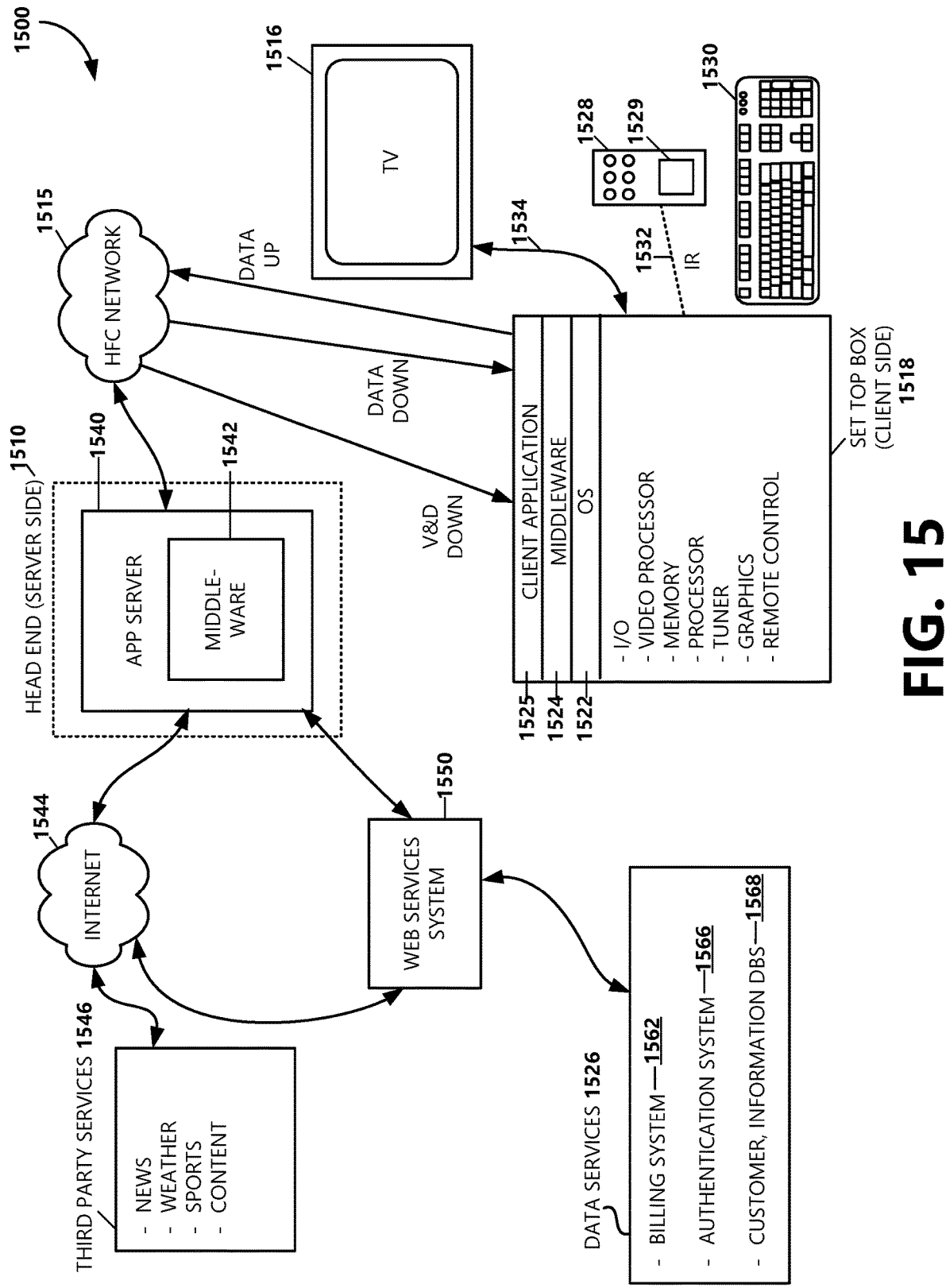
FIG. 15 is a block diagram illustrating components of a cable services system architecture providing an example operating environment according to aspects of the present disclosure.

FIG. 15 is a block diagram illustrating a cable television services system 1500 (hereafter referred to as "CATV") architecture providing an operating environment according to an aspect. Referring now to FIG. 15, digital and analog video programming, information content, and interactive television services are provided via a hybrid fiber coax (HFC) network 1515 to a television set 1516 for consumption by a cable television/services system customer. As is known to those skilled in the art, HFC networks 1515 combine both optical fiber and coaxial cable lines. Typically, optical fiber runs from the cable head end 1510 to neighborhoods of subscribers. Coaxial cable runs from the optical fiber feeders to each customer or subscriber. The functionality of the HFC network 1515 allows for efficient bidirectional data flow between the set-top box 1518 and the application server 1540 of the aspect.

The CATV system 1500 is in the form of a distributed client-server computing system for providing video and data flow across the HFC network 1515 between server-side services providers (e.g., cable television/services providers) via a server-side head end 1510 and a client-side customer via a set-top box (STB) 1518 functionally connected to a customer receiving device, such as the television set 1516. As is understood by those skilled in the art, modern CATV systems 1500 can provide a variety of services across the HFC network 1515 including traditional digital and analog video programming, telephone services, high speed Internet access, video-on-demand, and services.

On the client side of the CATV system 1500, digital and analog video programming and digital and analog data are provided to the customer television set 1516 via the STB 1518. Interactive television services that allow a customer to input data to the CATV system 1500 likewise are provided by the STB 1518. As illustrated in FIG. 15, the STB 1518 is a multipurpose computing device having a computer processor, memory, and an input/output mechanism. The input/output mechanism receives input from server-side processes via the HFC network 1515 and from customers via input devices such as a remote control device 1528, keyboard 1530, or other computing device, such as a tablet/slate computer, smart phone, etc. The remote control device 1528 and the keyboard 1530 can communicate with the STB 1518 via a suitable communication transport such as the infrared connection 1532. The remote control device 1528 can include a biometric input module 1529. The STB 1518 also includes a video processor for processing and providing digital and analog video signaling to the television set 1516 via a cable communication transport 1534. A multi-channel tuner is provided for processing video and data to and from the STB 1518 and the server-side head end system 1510, described below.

The STB 1518 also includes an operating system 1522 for directing the functions of the STB 1518 in conjunction with a variety of client applications 1525. For example, if a client application 1525 requires a news flash from a third-party news source to be displayed on the television 1516, the operating system 1522 can cause the graphics functionality and video processor of the STB 1518, for example, to output the news flash to the television 1516 at the direction of the client application 1525 responsible for displaying news items.

Because a variety of different operating systems 1522 can be utilized by a variety of different brands and types of set-top boxes 1518, a middleware layer 1524 can be provided to allow a given software application to be executed by a variety of different operating systems. According to an embodiment, the middleware layer 1524 can include a set of application programming interfaces (APIs) that are exposed to client applications and operating systems 1522 that allow client applications 1525 to communicate with the operating systems 1522 through common data calls understood via the API set. As described below, a corresponding middleware layer 1542 is included on the server side of the CATV system 1500 for facilitating communication between the server-side application server and the client-side STB 1518. The middleware layer 1542 of the server-side application server and the middleware layer 1524 of the client-side STB 1518 can format data passed between the client side and server side according to the Extensible Markup Language (XML).

According to one aspect, the STB 1518 passes digital and analog video and data signaling to the television 1516 via a one-way communication transport 1534. According to other aspects, two-way communication transports can be utilized, for example, via high definition multimedia (HDMI) ports. The STB 1518 can receive video and data from the server side of the CATV system 1500 via the HFC network 1515 through a video/data downlink and data via a data downlink. The STB 1518 can transmit data from the client side of the CATV system 1500 to the server side of the CATV system 1500 via the HFC network 1515 via one data uplink. The video/data downlink is an "in band" downlink that allows for digital and analog video and data signaling from the server side of the CATV system 1500 through the HFC network 1515 to the STB 1518 for use by the STB 1518 and for distribution to the television set 1516. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 15, between the HFC network 1515 and the set-top box 1518 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 1518 and the server-side application server 1540 is typically passed through the "out of band" data links. Alternatively, an "in band" data carousel can be positioned in an "in band" channel into which a data feed can be processed from the application server 1540 through the HFC network 1515 to the STB 1518. Operation of data transport between components of the CATV system 1500, described with reference to FIG. 15, is well known to those skilled in the art.

Referring still to FIG. 15, the head end 1510 of the CATV system 1500 is positioned on the server side of the CATV system and includes hardware and software systems responsible for originating and managing content for distributing through the HFC network 1515 to client-side STBs 1518 for presentation to customers. As described above, a number of services can be provided by the CATV system 1500, including digital and analog video programming, interactive television services, telephone services, video-on-demand services, targeted advertising, and/or provision of supplemental content.

The application server 1540 can be configured as a computing system operative to assemble and manage data sent to and received from the STB 1518 via the HFC network 1515. As described above, the application server 1540 includes a middleware layer 1542 for processing and preparing data from the head end 1510 of the CATV system 1500 for receipt and use by the client-side STB 1518. For example, the application server 1540 via the middleware layer 1542 can obtain supplemental content from third-party services 1546 via the Internet 1544 for transmitting to a customer through the HFC network 1515, the STB 1518, and recording by a local or remote DVR. For example, content metadata from a third-party content provider service can be downloaded by the application server 1540 via the Internet 1544. When the application server 1540 receives the downloaded content metadata, the middleware layer 1542 can be utilized to format the content metadata for receipt and use by the STB 1518. Therefore, content metadata can be sent and categorized based on the availability to the customer's program guide data.

According to one embodiment, data obtained and managed by the middleware layer 1542 of the application server 1540 is formatted according to the Extensible Markup Language and is passed to the STB 1518 through the HFC network 1515 where the XML-formatted data can be utilized by a client application 1525 in concert with the middleware layer 1524, as described above. As should be appreciated by those skilled in the art, a variety of third-party services data 1546, including news data, weather data, sports data and other information content can be obtained by the application server 1540 via distributed computing environments such as the Internet 1544 for provision to customers via the HFC network 1515 and the STB 1518.

According to aspects, the application server 1540 obtains customer support services data, including billing data, information on customer work order status, answers to frequently asked questions, services provider contact information, and the like from data services 1526 for provision to the customer via an interactive television session. The data services 1526 include a number of services operated by the services provider of the CATV system 1500 which can include profile and other data associated with a given customer.

A billing system 1562 can include information such as a customer's name, street address, business identification number, Social Security number, credit history, and information regarding services and products subscribed to by the customer. According to embodiments, the billing system 1562 can also include billing data for services and products subscribed to by the customer for bill processing, billing presentment and payment receipt.

A customer information database 1568 can include general information about customers such as place of employment, business address, business telephone number, and demographic information such as age, gender, educational level, and the like. The customer information database 1568 can also include information on pending work orders for services or products ordered by the customer. The customer information database 1568 can also include general customer information such as answers to frequently asked customer questions and contact information for various service provider offices/departments. As should be understood, this information can be stored in a variety of disparate databases operated by the cable services provider.

Referring still to FIG. 15, web services system 1550 is illustrated between the application server 1540 and the data services 1526. According to aspects, web services system 1550 serves as a collection point for data requested from each of the disparate data services systems comprising the data services 1526. According to aspects, when the application server 1540 requires customer services data from one or more of the data services 1526, the application server 1540 passes a data query to the web services system 1550. The web services system 1550 formulates a data query to each of the available data services systems for obtaining any required data for a requesting customer as identified by a set-top box identification associated with the customer.

The web services system 1550 serves as an abstraction layer between the various data services systems and the application server 1540. That is, the application server 1540 is not required to communicate with the disparate data services systems, nor is the application server 1540 required to understand the data structures or data types utilized by the disparate data services systems. The web services system 1550 is operative to communicate with each of the disparate data services systems for obtaining necessary customer data. The customer data obtained by the web services system is assembled and is returned to the application server 1540 for ultimate processing via the middleware layer 1542, as described above. An authentication system 1566 can include information such as secure user names, subscriber profiles, subscriber IDs, and passwords utilized by customers for access to network services. As should be understood by those skilled in the art, the disparate systems 1550, 1562, 1566, 1568 can be integrated or provided in any combination of separate systems, wherein FIG. 15 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing new client acquisition insights and forecasting, the system comprising:
    at least one processor;
    a memory storage device coupled to the at least one processor, the memory storage device including instructions that when executed by the at least one processor cause the system to provide:
        a client insights and forecasting engine configured to:
            use machine learning to analyze historical data collected for a plurality of clients in a service-provisioning system over a specified time period to:
                identify a plurality of client segments, wherein each client segment includes a plurality of clients sharing one or a combination of similar attributes;
                for each identified client segment:
                    determine cumulative marginal values associated with acquiring and provisioning service to the clients in the client segment; and
                    learn client behavior patterns and effects of the client behavior patterns on the service-provisioning system;
                generate a machine-learned model based on the identified client segments, determined cumulative marginal values, the learned client behavior patterns, and the learned effects of the client behavior patterns on the service-provisioning system; and
                use the machine-learned model to forecast cumulative marginal values for a specified client segment of the plurality of client segments; and
        a dashboard user interface engine configured to:
            generate a dashboard user interface;
            receive a specification of a first client segment via the dashboard user interface, wherein cumulative marginal values are forecast by applying the machine-learned model for the first client segment;
            receive a specification of a second client segment via the dashboard user interface, wherein cumulative marginal values are forecast by applying the machine-learned model for the second client segment; and
            update the dashboard user interface to display the forecasted cumulative marginal values for the first client segment with the forecasted cumulative marginal values for the second client segment to enable a comparison of the forecasted cumulative marginal values of the first client segment and the second client segment.

2. The system of claim 1, wherein the dashboard user interface engine is configured to
    generate and provide the dashboard user interface for display on a computing device, wherein the forecasted cumulative marginal values of the first client segment and the second client segment provide decision making information for enabling an efficient allocation of resources for acquiring and provisioning service.

3. The system of claim 2, wherein the forecasted cumulative marginal values of the first client segment and the second client segment indicate whether allocating resources for acquiring and provisioning service positively or negatively affects the service-provisioning system.

4. The system of claim 1, wherein the one or a combination of similar attributes for each client segment include:
    a product attribute;
    a sales channel attribute;
    a client subscriber credit classification attribute;
    a dwelling type attribute;
    a market region attribute;
    an income age attribute; and
    an installation type attribute.

5. The system of claim 4, wherein the product attribute defines a type of service provisioned to the plurality of clients in each client segment, the type of service including one or a combination of:
    video services;
    data services; and
    phone services.

6. The system of claim 1, wherein the client insights and forecasting engine is configured to learn client behavior patterns associated with one or more of:
    client churn rates;
    client disconnections;
    client service usage; and
    client subscriber payment history.

7. The system of claim 1, wherein the specification of the first client segment and the second client segment are received as part of making a determination of allocating resources for acquiring or provisioning service to a new client associated with the first or the second client segment.

8. The system of claim 1, further to:
    receive selection of a side-by-side comparison view; and
    update the display of the dashboard user interface to include a side-by-side display for comparison of the forecasted cumulative marginal values for the first client segment and the forecasted cumulative marginal values for the second client segment.

9. A method for providing new client acquisition insights and forecasting, the method comprising:
  generating and providing a dashboard user interface for display on a computing device;
  receiving a specification of a first client segment of a plurality of client segments via the dashboard user interface;
  applying a machine-learned model to forecast cumulative marginal values for the first client segment, wherein the machine-learned model is generated based on analyzing historical data collected for a plurality of clients in a service-provisioning system over a specified time period, identifying the plurality of client segments, wherein each client segment includes a plurality of clients sharing one or a combination of similar attributes, determining cumulative marginal values for each identified client segment associated with acquiring and provisioning service to the clients in the client segment, and learning client behavior patterns and effects of the client behavior patterns on the service-provisioning system;
  receiving a specification of a second client segment of the plurality of client segments via the dashboard user interface;
  applying the machine-learned model to forecast cumulative marginal values for the second client segment; and
  updating the display of the dashboard user interface to include a display of the forecasted cumulative marginal values for the first client segment with the forecasted cumulative marginal values for the second client segment to provide decision making information to enable an efficient allocation of resources for acquiring and provisioning service to a new client.

10. The method of claim 9, wherein the one or a combination of similar attributes for each client segment include:
  a product attribute;
  a sales channel attribute;
  a client subscriber credit classification attribute;
  a dwelling type attribute;
  a market region attribute;
  an income age attribute; and
  an installation type attribute.

11. The method of claim 9, wherein learning client behavior patterns comprises learning client behavior patterns associated with one or more of:
  client churn rates;
  client disconnections;
  client service usage; and
  client subscriber payment history.

12. The method of claim 9, wherein receiving the specification of the first client segment is part of a decision making process associated with allocating resources for acquiring or provisioning service to a new client associated with the first client segment.

13. The method of claim 9, further comprising:
  receiving a selection of a side-by-side comparison view; and
  updating the display of the dashboard user interface to include a side-by-side display for comparison of the forecasted cumulative marginal values for the first client segment and the forecasted cumulative marginal values for the second client segment.

14. The method of claim 13, wherein updating the display of the dashboard user interface to include a side-by-side display of the forecasted cumulative marginal values comprises displaying data visualizations of the forecasted cumulative marginal values for the first client segment and the second client segment.

15. A non-transitory computer readable storage device that includes executable instructions which, when executed by a processor, cause the processor to:
  generate and provide a dashboard user interface for display on a computing device;
  receive a specification of a first client segment of a plurality of client segments via the dashboard user interface;
  apply a machine-learned model to forecast cumulative marginal values for the first client segment, wherein the machine-learned model is generated based on analyzing historical data collected for a plurality of clients in a service-provisioning system over a specified time period, identifying the plurality of client segments, wherein each client segment includes a plurality of clients sharing one or a combination of similar attributes, determining cumulative marginal values for each identified client segment associated with acquiring and provisioning service to the clients in the client segment, and learning client behavior patterns and effects of the client behavior Patterns on the service-provisioning system;
  receive a specification of a second client segment of the plurality of client segments via the dashboard user interface;
  apply the machine-learned model to forecast cumulative marginal values for the second client segment; and
  update the display of the dashboard user interface to include a display of the forecasted cumulative marginal values for the first client segment with the forecasted cumulative marginal values for the second client segment to provide decision making information to enable an efficient allocation of resources for acquiring and provisioning service to a new client.

16. The non-transitory computer readable storage device of claim 15, wherein the one or a combination of similar attributes for each client segment include:
  a product attribute;
  a sales channel attribute;
  a client subscriber credit classification attribute;
  a dwelling type attribute;
  a market region attribute;
  an income age attribute; and
  an installation type attribute.

17. The non-transitory computer readable storage device of claim 15, wherein the learning client behavior patterns considers at least one of:
  client churn rates;
  client disconnections;
  client service usage; and
  client subscriber payment history.

18. The non-transitory computer readable storage device of claim 15, wherein the specification is received as part of a decision making process associated with allocating resources for acquiring or provisioning service to a new client associated with the first client segment.

19. The non-transitory computer readable storage device of claim 15, further comprising executable instructions which, when executed, cause the processor to:
  receive a selection of a side-by-side comparison view; and
  update the display of the dashboard user interface to include a side-by-side display for comparison of the forecasted cumulative marginal values for the first client segment and the forecasted cumulative marginal values for the second client segment.

20. The non-transitory computer readable storage device of claim 19, wherein the processor is configured to update the dashboard user interface with data visualizations of the forecasted cumulative marginal values for the first client segment and the second client segment.

* * * * *